United States Patent
Wang et al.

(10) Patent No.: US 12,047,911 B2
(45) Date of Patent: Jul. 23, 2024

(54) PHYSICAL SIDELINK SHARED CHANNEL (PSSCH) RESOURCE ALLOCATION

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/305,791

(22) Filed: Jul. 14, 2021

(65) Prior Publication Data

US 2022/0030551 A1    Jan. 27, 2022

Related U.S. Application Data

(60) Provisional application No. 63/056,435, filed on Jul. 24, 2020.

(51) Int. Cl.
| | |
|---|---|
| *H04W 72/02* | (2009.01) |
| *H04L 1/1607* | (2023.01) |
| *H04L 5/00* | (2006.01) |
| *H04W 72/0446* | (2023.01) |
| *H04W 72/0453* | (2023.01) |
| *H04W 72/20* | (2023.01) |

(52) U.S. Cl.
CPC ........... *H04W 72/02* (2013.01); *H04L 1/1614* (2013.01); *H04L 5/0041* (2013.01); *H04W 72/0446* (2013.01); *H04W 72/0453* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2021/0337527 A1* | 10/2021 | Hui | ................... | H04L 1/1861 |
| 2023/0037535 A1* | 2/2023 | Luo | ................... | H04W 72/20 |

\* cited by examiner

*Primary Examiner* — Kouroush Mohebbi
(74) *Attorney, Agent, or Firm* — Arun Swain

(57) ABSTRACT

This disclosure provides systems, methods, and devices for wireless communication that support physical sidelink shared channel (PSSCH) resource allocation operations. A transmit (TX) user equipment (UE) transmit a physical sidelink control channel (PSCCH) that indicates an allocated PSSCH resource portion. In a first aspect, the portion includes two non-contiguous subchannels. In a second aspect, the PSCCH indicates a layer or a node of a layer of a resource allocation layer structure. In a third aspect, the PSCCH indicates a subchannel group size for an allocated resource, using a bitmask or a value that corresponds to a subchannel and a group size combination. In a fourth aspect, the TX UE determines the portion based multiple values of subchannel and length combinations, the multiple values determined by disabling one or more combinations of a total number of subchannel and length combination for contiguous allocation, or for contiguous and non-contiguous allocation.

48 Claims, 11 Drawing Sheets

| Subchannel | 0 | 1 | 2 | 3 | 4 | 5 |
|---|---|---|---|---|---|---|
| SCGsize = 2 | 0 | | 1 | | 2 | |
| SCGsize = 3 | 0 | | | 1 | | |

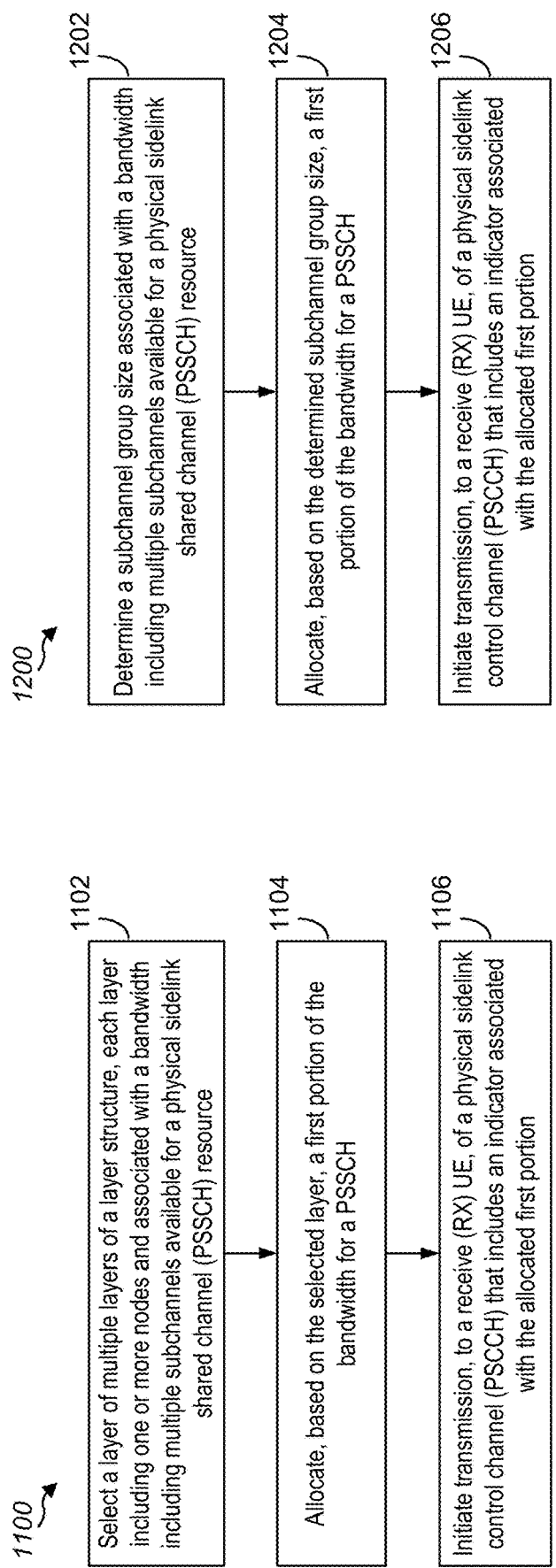

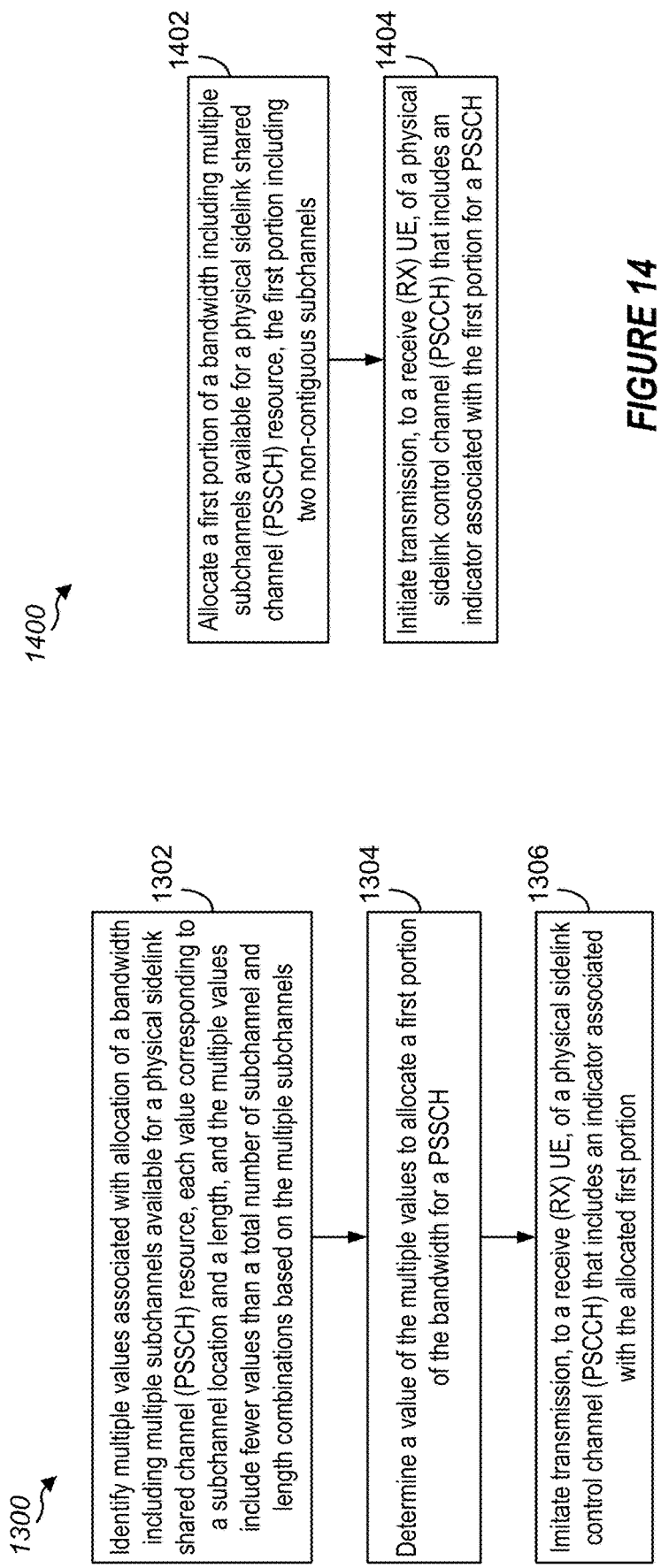

PHYSICAL SIDELINK SHARED CHANNEL (PSSCH) RESOURCE ALLOCATION

CROSS-REFERENCE TO RELATED APPLICATIONS

This application claims the benefit of U.S. Provisional Patent Application No. 63/056,435, entitled, "PHYSICAL SIDELINK SHARED CHANNEL (PSSCH) RESOURCE ALLOCATION," filed on Jul. 24, 2020, which is expressly incorporated by reference herein in its entirety.

TECHNICAL FIELD

Aspects of the present disclosure relate generally to wireless communication systems, and more particularly, to physical sidelink shared channel (PSSCH) resource allocation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

The UEs may be utilized in a variety of scenarios, such as in industrial environment control networks in which utilizing wireless links may, for example, reduce the time and expense required for reconfiguration of the control network on the factory floor. However, establishing and maintaining reliable wireless links between an industrial controller and one or industrial Internet of things (IIoT) devices associated therewith can be problematic. For example, the industrial controllers are generally located close to machinery which may cause issues (e.g., shadowing, electrical noise, etc.) in maintaining a reliable and adequate communication link with ones of the many IIoT devices of the control network. Moreover, the latency and reliability requirements for IIoT traffic can prove challenging to meet in a wireless control network implementation. For example, latency and reliability requirements for industrial Internet of things (IIoT) traffic are stringent (e.g., latency $\approx$1-2 ms and reliability $\approx 10^{-5}$-$10^{-6}$ block error rate (BLER)). Additionally, conventional wireless communication protocols allocate resources so that a transmitter (TX) device, such as a programmable logic controller (PLC) device, to perform a sidelink communication. The TX device may transmit a physical sidelink control channel (PSCCH) containing information about a physical sidelink shared channel (PSSCH) resources, such as a bandwidth associated with one or more subchannels and one or more resource reservations in future slots. According to a conventional approach for sidelink communication and PSSCH resource allocation, such as techniques described in release 16 for sidelink communication for cellular-vehicle-to-everything (C-V2X), only continuous frequency domain allocation is available for the PSSCH resource allocation. This conventional approach can result in an unreliable PSSCH in an IIoT RF environment due to limited frequency diversity resulting from being limited to continuous frequency domain allocation. Additionally, a relatively large number of bits is needed for control signaling, such as frequency domain resource allocation (FDRA) and time domain resource allocation (TDRA). As a number of reservations (associated with PSSCH) increase, so too does a total number of bits needed for the control signaling, which leads to a large overhead in control signaling and, thus, an unreliable PSCCH due to decreased coding gain.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes selecting a layer of multiple layers of a layer structure. Each layer includes one or more nodes and associated with a bandwidth including multiple subchannels available for a physical sidelink shared channel (PSSCH) resource. The method further includes allocating, based on the selected layer, a first portion of the bandwidth for a PSSCH, and transmitting, to a receive (RX) UE, a physical sidelink control channel (PSCCH) that includes an indicator associated with the allocated first portion.

Another innovative aspect of the subject matter described in this disclosure can be implemented in a UE. The UE includes at least one processor and a memory coupled with the at least one processor and storing processor-readable instructions that, when executed by the at least one processor, is configured to select a layer of multiple layers of a layer structure. Each layer includes one or more nodes and associated with a bandwidth including multiple subchannels available for a PSSCH resource. The at least one processor is further configured to allocate, based on the selected layer, a first portion of the bandwidth for a PSSCH, and initiate transmission of a PSCCH that includes an indicator associated with the allocated first portion.

Another innovative aspect of the subject matter described in this disclosure can be implemented in an apparatus configured for wireless communication. The apparatus includes means for selecting a layer of multiple layers of a layer structure. Each layer includes one or more nodes and associated with a bandwidth including multiple subchannels available for a PSSCH resource. The apparatus further includes means for allocating, based on the selected layer, a first portion of the bandwidth for a PSSCH, and means for transmitting, to an RX UE, a PSCCH that includes an indicator associated with the allocated first portion.

Another innovative aspect of the subject matter described in this disclosure can be implemented in a non-transitory computer-readable medium storing instructions that, when executed by a processor, cause the processor to perform operations including selecting a layer of multiple layers of a layer structure. Each layer including one or more nodes and associated with a bandwidth including multiple subchannels available for a PSSCH resource. The operations further including allocating, based on the selected layer, a first portion of the bandwidth for a PSSCH, and initiating transmission of a PSCCH that includes an indicator associated with the allocated first portion.

Another innovative aspect of the subject matter described in this disclosure can be implemented in an apparatus configured for wireless communication. The apparatus includes an interface configured for wireless communication and a processor system coupled to the interface. The processor system is configured to select a layer of multiple layers of a layer structure, each layer including one or more nodes and associated with a bandwidth including multiple subchannels available for a PSSCH resource; allocate, based on the selected layer, a first portion of the bandwidth for a PSSCH; and initiate transmission of a PSCCH that includes an indicator associated with the allocated first portion. In some implementations, the interface is configured to transmit the PSCCH.

Another innovative aspect of the subject matter described in this disclosure can be implemented in a method of wireless communication performed by a UE. The method includes determining a subchannel group size associated with a bandwidth including multiple subchannels available for a PSSCH resource, and allocating, based on the determined subchannel group size, a first portion of the bandwidth for a PSSCH. The method further includes transmitting, to an RX UE, a PSCCH that includes an indicator associated with the allocated first portion.

Another innovative aspect of the subject matter described in this disclosure can be implemented in a UE. The UE includes at least one processor and a memory coupled with the at least one processor and storing processor-readable instructions that, when executed by the at least one processor, is configured to determine a subchannel group size associated with a bandwidth including multiple subchannels available for a PSSCH resource, and allocate, based on the determined subchannel group size, a first portion of the bandwidth for a PSSCH. The at least one processor is further configured to initiate transmission, to an RX UE, of a PSCCH that includes an indicator associated with the allocated first portion.

Another innovative aspect of the subject matter described in this disclosure can be implemented in an apparatus configured for wireless communication. The apparatus includes means for determining a subchannel group size associated with a bandwidth including multiple subchannels available for a PSSCH resource, and means for allocating, based on the determined subchannel group size, a first portion of the bandwidth for a PSSCH. The apparatus further includes means for transmitting, to an RX UE, a PSCCH that includes an indicator associated with the allocated first portion.

Another innovative aspect of the subject matter described in this disclosure can be implemented in a non-transitory computer-readable medium storing instructions that, when executed by a processor, cause the processor to perform operations including determining a subchannel group size associated with a bandwidth including multiple subchannels available for a PSSCH resource; allocating, based on the determined subchannel group size, a first portion of the bandwidth for a PSSCH; and initiating transmission, to an RX UE, of a PSCCH that includes an indicator associated with the allocated first portion.

Another innovative aspect of the subject matter described in this disclosure can be implemented in an apparatus configured for wireless communication. The apparatus includes an interface configured for wireless communication and a processor system coupled to the interface. The processor system is configured to determine a subchannel group size associated with a bandwidth including multiple subchannels available for a PSSCH resource; allocate, based on the determined subchannel group size, a first portion of the bandwidth for a PSSCH; and initiate transmission, to an RX UE, of a PSCCH that includes an indicator associated with the allocated first portion. In some implementations, the interface is configured to transmit the PSCCH.

Another innovative aspect of the subject matter described in this disclosure can be implemented in a method of wireless communication performed by a UE. The method includes identifying multiple values associated with allocation of a bandwidth including multiple subchannels available for a PSSCH resource. Each value corresponds to a subchannel location and a length. The multiple values include fewer values than a total number of subchannel and length combinations based on the multiple subchannels. The method further includes determining a value of the multiple values to allocate a first portion of the bandwidth for a PSSCH, and transmitting, to an RX UE, a PSCCH that includes an indicator associated with the allocated first portion.

Another innovative aspect of the subject matter described in this disclosure can be implemented in a UE. The UE includes at least one processor and a memory coupled with the at least one processor and storing processor-readable instructions that, when executed by the at least one processor, is configured to identify multiple values associated with allocation of a bandwidth including multiple subchannels available for a PSSCH resource. Each value corresponds to a subchannel location and a length. The multiple values include fewer values than a total number of subchannel and length combinations based on the multiple subchannels. The at least one processor is further configured to determine a value of the multiple values to allocate a first portion of the bandwidth for a PSSCH, and initiate transmission, to an RX UE, of a PSCCH that includes an indicator associated with the allocated first portion.

Another innovative aspect of the subject matter described in this disclosure can be implemented in an apparatus configured for wireless communication. The apparatus includes means for identifying multiple values associated with allocation of a bandwidth including multiple subchannels available for a PSSCH resource. Each value corresponds to a subchannel location and a length. The multiple values include fewer values than a total number of subchannel and length combinations based on the multiple subchannels. The apparatus further includes means for determining a value of the multiple values to allocate a first portion of the bandwidth for a PSSCH, and means for transmitting, to an RX UE, a PSCCH that includes an indicator associated with the allocated first portion.

Another innovative aspect of the subject matter described in this disclosure can be implemented in a non-transitory computer-readable medium storing instructions that, when executed by a processor, cause the processor to perform operations including identifying multiple values associated with allocation of a bandwidth including multiple subchannels available for a PSSCH resource. Each value corresponds to a subchannel location and a length. The multiple values include fewer values than a total number of subchannel and length combinations based on the multiple subchannels. The operations further include determining a value of the multiple values to allocate a first portion of the bandwidth for a PSSCH, and initiating transmission, to an RX UE, of a PSCCH that includes an indicator associated with the allocated first portion.

Another innovative aspect of the subject matter described in this disclosure can be implemented in an apparatus configured for wireless communication. The apparatus includes an interface configured for wireless communication and a processor system coupled to the interface. The processor system is configured to identify multiple values associated with allocation of a bandwidth including multiple subchannels available for a PSSCH resource. Each value corresponds to a subchannel location and a length. The multiple values include fewer values than a total number of subchannel and length combinations based on the multiple subchannels. The processor system is further configured to determine a value of the multiple values to allocate a first portion of the bandwidth for a PS SCH, and initiate transmission, to an RX UE, of a PSCCH that includes an indicator associated with the allocated first portion. In some implementations, the interface is configured to transmit the PSCCH.

Another innovative aspect of the subject matter described in this disclosure can be implemented in a method of wireless communication performed by a UE. The method includes allocating a first portion of a bandwidth including multiple subchannels available for a PSSCH resource. The first portion includes two non-contiguous subchannels. The method further includes transmitting, to an RX UE, a PSCCH that includes an indicator associated with the first portion for a PSSCH.

Another innovative aspect of the subject matter described in this disclosure can be implemented in a UE. The UE includes at least one processor and a memory coupled with the at least one processor and storing processor-readable instructions that, when executed by the at least one processor, is configured to allocate a first portion of a bandwidth including multiple subchannels available for a PSSCH resource. The first portion includes two non-contiguous subchannels. The at least one processor is further configured to initiate transmission, to an RX UE, of a PSCCH that includes an indicator associated with the first portion for a PSSCH.

Another innovative aspect of the subject matter described in this disclosure can be implemented in an apparatus configured for wireless communication. The apparatus includes means for allocating a first portion of a bandwidth including multiple subchannels available for a PSSCH resource. The first portion includes two non-contiguous subchannels. The apparatus further includes means for transmitting, to an RX UE, a PSCCH that includes an indicator associated with the first portion for a PSSCH.

Another innovative aspect of the subject matter described in this disclosure can be implemented in a non-transitory computer-readable medium storing instructions that, when executed by a processor, cause the processor to perform operations including allocating a first portion of a bandwidth including multiple subchannels available for a PSSCH resource, the first portion including two non-contiguous subchannels; and transmitting, to an RX UE, a PSCCH that includes an indicator associated with the first portion for a PSSCH.

Another innovative aspect of the subject matter described in this disclosure can be implemented in an apparatus configured for wireless communication. The apparatus includes an interface configured for wireless communication and a processor system coupled to the interface. The processor system is configured to allocate a first portion of a bandwidth including multiple subchannels available for a PSSCH resource, the first portion including two non-contiguous subchannels; and to initiate transmission, to an RX UE, of a PSCCH that includes an indicator associated with the first portion for a PSSCH. In some implementations, the interface is configured to transmit the PSCCH.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 11 is a flow diagram illustrating an example process that supports PSSCH resource allocation according to some aspects.

FIG. 12 is a flow diagram illustrating an example process that supports PSSCH resource allocation according to some aspects.

FIG. 13 is a flow diagram illustrating an example process that supports PSSCH resource allocation according to some aspects.

FIG. 14 is a flow diagram illustrating an example process that supports PSSCH resource allocation according to some aspects.

DETAILED DESCRIPTION

Figure 1:
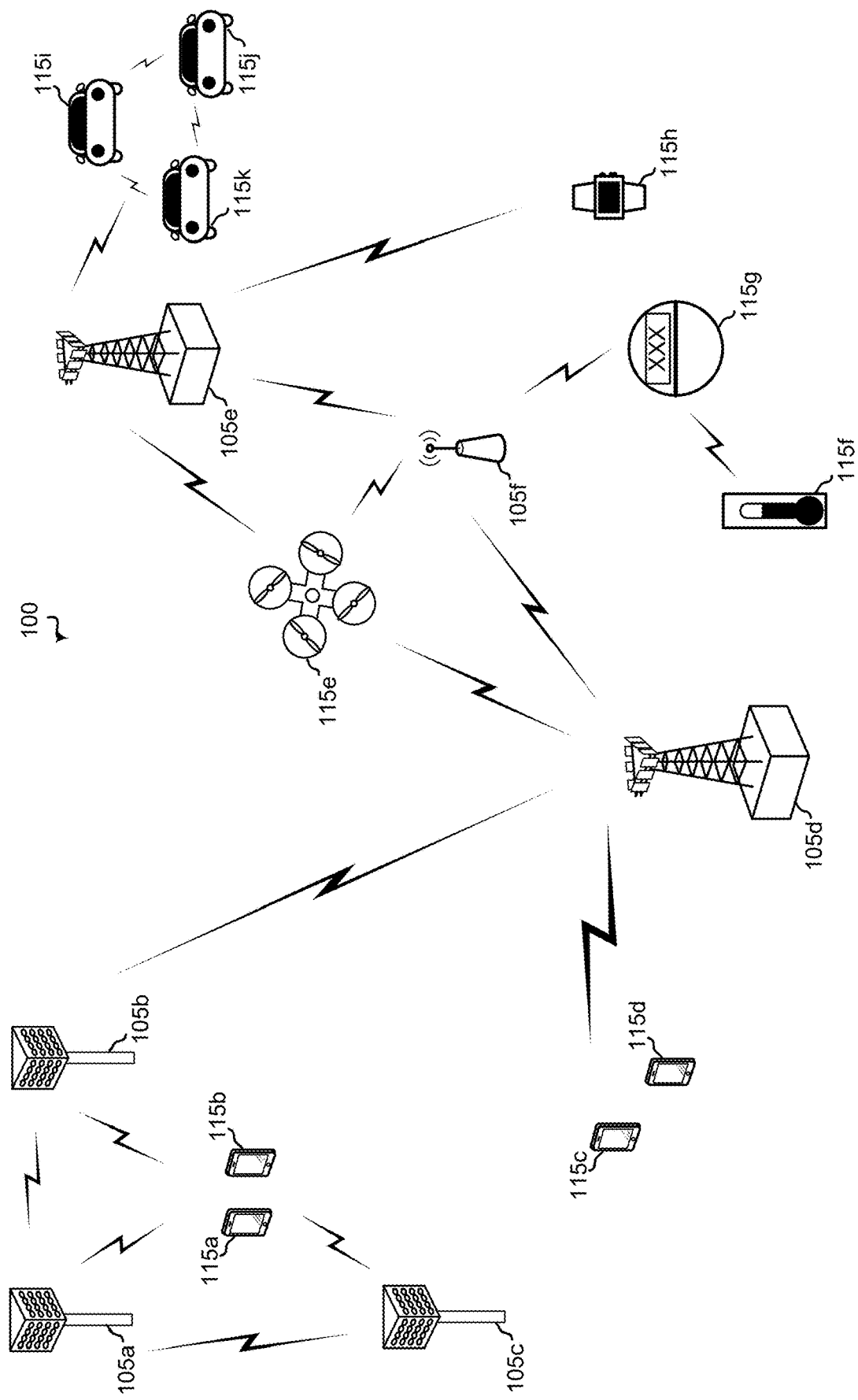
FIG. 1 is a block diagram illustrating details of an example wireless communication system.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for supporting physical sidelink shared channel (PSSCH) resource allocation operations. For example, the sidelink resource allocation may be performed by a transmit (TX) user equipment (UE). The TX UE may be a programmable logic controller (PLC) device. In various aspects, the TX UE may allocate a portion of a bandwidth available for a PSSCH resource and transmit, to a receive (RX) UE, a physical sidelink control channel (PSCCH) that includes the indicator, such as a set of bits, associated with the portion. In some implementations, the portion includes two non-contiguous subchannels. In some implementations, the TX may determine a layer of multiple layers and generate the indicator based on the layer. To illustrate, the indicator may indicate a layer, a node of a layer, or both. In some implementations, the TX UE determines a subchannel group size for an allocated resource and determines the indicator based the group size. To illustrate, the indicator may include a bitmask associated with the resource pool and each bit of the bit mask corresponds to a different subchannel group. Alternatively, the indicator may be a value that corresponds to a subchannel and a group size combination. In some implementations, the TX UE determines a value of multiple values based on a subchannel location and a length for an allocated resource. The multiple values may include fewer values than a total number of subchannel and length combination for contiguous allocation, or a total number of subchannel and length combination for contiguous and non-contiguous allocation. For example, the multiple values may be determined by disabling one or more subchannel and length combination for contiguous allocation, or for contiguous and non-contiguous allocation.

Particular implementations of the subject matter described in this disclosure can be implemented to realize one or more of the following potential advantages. In some aspects, the present disclosure provides techniques for a PSSCH resource allocation. For example, the TX UE may allocate the PSSCH resource to a number of sub-channels within a resource pool, which may be a large resource pool in IIoT cases implantations. The TX UE may indicate the allocated PSSCH resource using the indicator, such as one or more bits. The number of bits of the indicator, such as a number FDRA bits, may be reduced as compared to convention techniques, such as C-V2X messaging techniques. By having a relatively low number of bits, a relatability of the PSCCH and the coding gain is maintained. Additionally, an amount of overhead message is reduced as compared to convention techniques, such as C-V2X messaging techniques. As another example, the TX UE may allocate the PSSCH resources such that a set of allocated subchannels is non-contiguous in the frequency domain. By utilizing a set of subchannels that are non-contiguous in the frequency domain, the allocation of PSSCH resources may have frequency selectivity, frequency diversity, and flexibility, such as in an IIoT implementations in which an RF environment is complex and has interference from a variety of sources (e.g., neighboring machinery).

This disclosure relates generally to providing or participating in sidelink resource scheduling for unicast messaging operations. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10s of bits per sec), ultra-low energy (such as ~10+years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115*a*-115*d* of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115*e*-115*k* illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
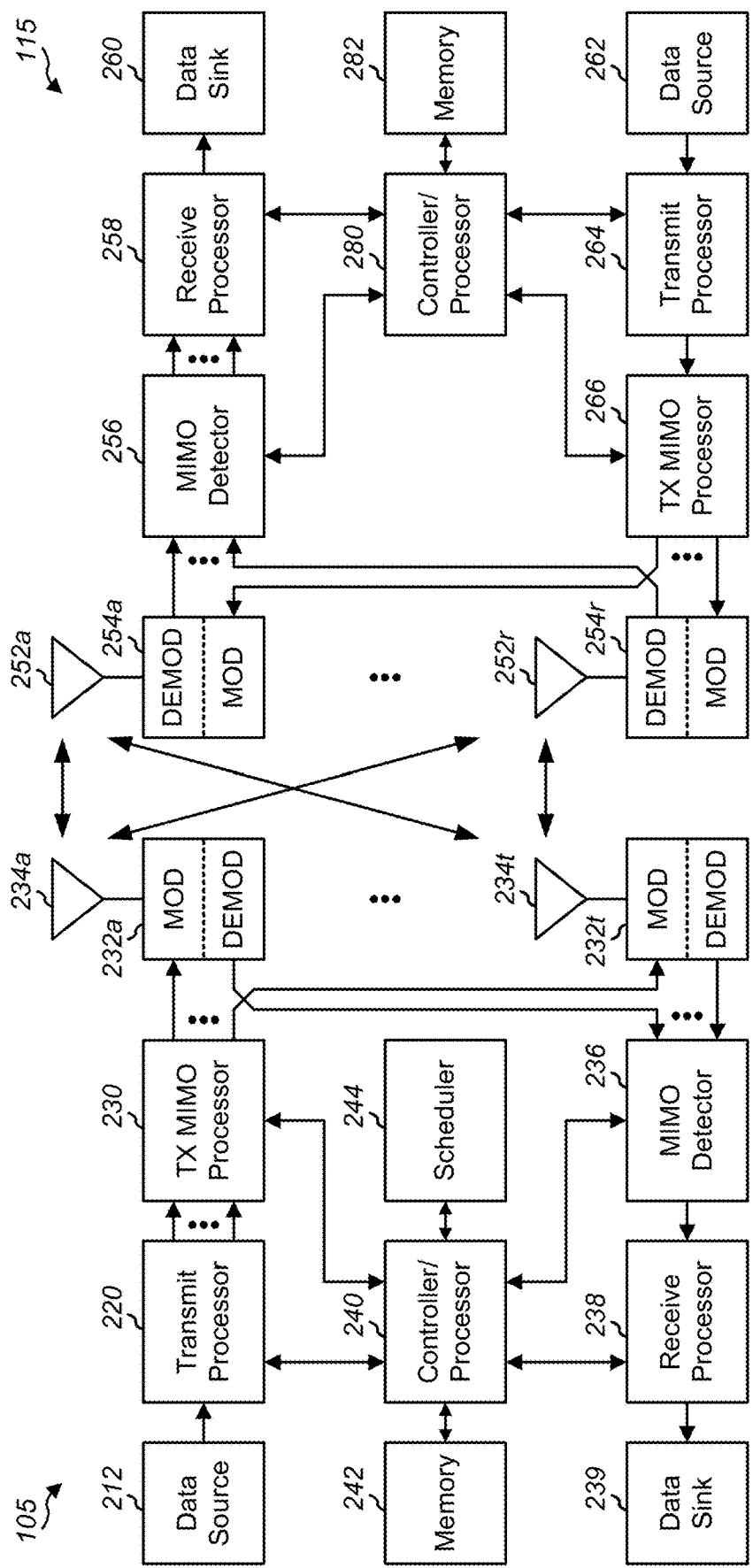
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 3-16, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

In an example implementation of wireless network 100, one or more of UEs 115 may include various forms of IoT devices, such as industrial Internet of things (IIoT) devices, in communication via wireless links of wireless network 100. For example, the IIoT devices of some deployments may include sensors (e.g., position sensors, temperature sensors, pressure sensors, power sensors, motion detectors, proximity detectors, accelerometers, scanners, cameras, probes, switches, etc.), actuators (e.g., linear actuators, rotary actuators, servomechanism, solenoid, stepper motor, electric motor, comb drive actuators, etc.), or a combination thereof. A large number of IIoT devices may be in communication with a corresponding device, such as an industrial controller (e.g., computer, programmable logic controller (PLC), supervisory control and data acquisition (SCADA) system, etc.), of control network in an industrial environment, such as a manufacturing facility, materials processing facility, warehouse, etc. For example, a PLC may be in communication with 20-100 or more sensors and/or actuators (S/As), wherein 1-1000 such PLCs may be deployed throughout an industrial (e.g., manufacturing) facility.

Figure 3:
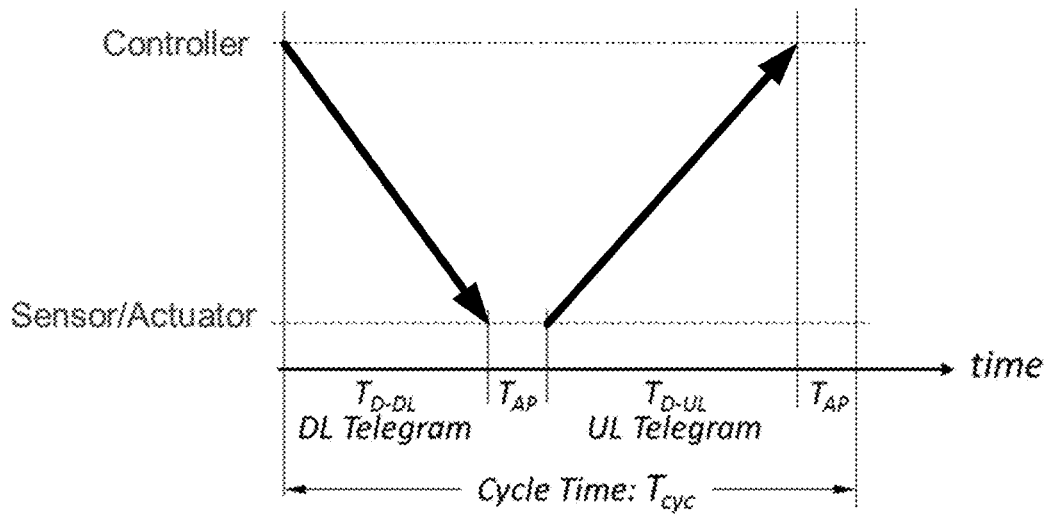
FIG. 3 is a diagram illustrating the deterministic and periodic nature of industrial
Internet of things (IIoT) traffic.

The various IIoT devices of an industrial environment control network may periodically communicate information (e.g., measurements, state information, command acknowledgments, etc.) to or receive information (e.g., commands, parameters, settings, state information, etc.) from an associated industrial controller. For example, cyclic exchanges may be performed between an industrial controller and a large number of IIoT devices of a control network. Accordingly, the IIoT traffic may be deterministic and periodic, as represented in the diagram of FIG. 3.

Latency and reliability requirements for IIoT traffic are often stringent since output results typically must be produced in response to input conditions within a limited time to avoid unintended, and even dangerous, operation of an industrial process. For example, latency requirements of IIoT traffic may be on the order of 1-2 ms and the reliability requirements may be on the order of $10^{-5}$-$10^{-6}$ block error rate (BLER). Accordingly, both data and control channels, such as a PSSCH and a PSCCH, of an industrial environment control network may be designed to meet these overall requirements. Meeting such overall requirements can be challenging because an RF environment associated with an IIoT network may include a variety of blockage and interference.

IIoT traffic is typically deterministic and has a relatively small packet size, such as a packet size of 32-256 bytes. Additionally, a bandwidth required for IIoT traffic, such as a single packet, may be relatively small; for example, two RBs might be sufficient. It is noted an S/A may have one or more operational constraints that limit the S/A's bandwidth capability, processing power capability, or both. For a particular IIoT implementation, an overall bandwidth for IIoT implementation may be relatively large with dedicated frequency bands, unlicensed frequency bands, or a combination thereof. However, despite the relatively large overall bandwidth, one or more SAs do not need to detect or monitor all transmissions within the overall bandwidth.

Control networks in industrial environments have traditionally utilized wireline communication links. For example, IIoT devices may be in communication with a corresponding industrial controller using wired network links, such as 100 base T Ethernet links. Such a control network may be quite complicated with respect to establishing and maintaining the network links, reconfiguring the network, etc. For example, the task of reconfiguring a control network including a large number of IIoT devices deployed on a factory floor can be costly in both time and expense.

Figure 4A:
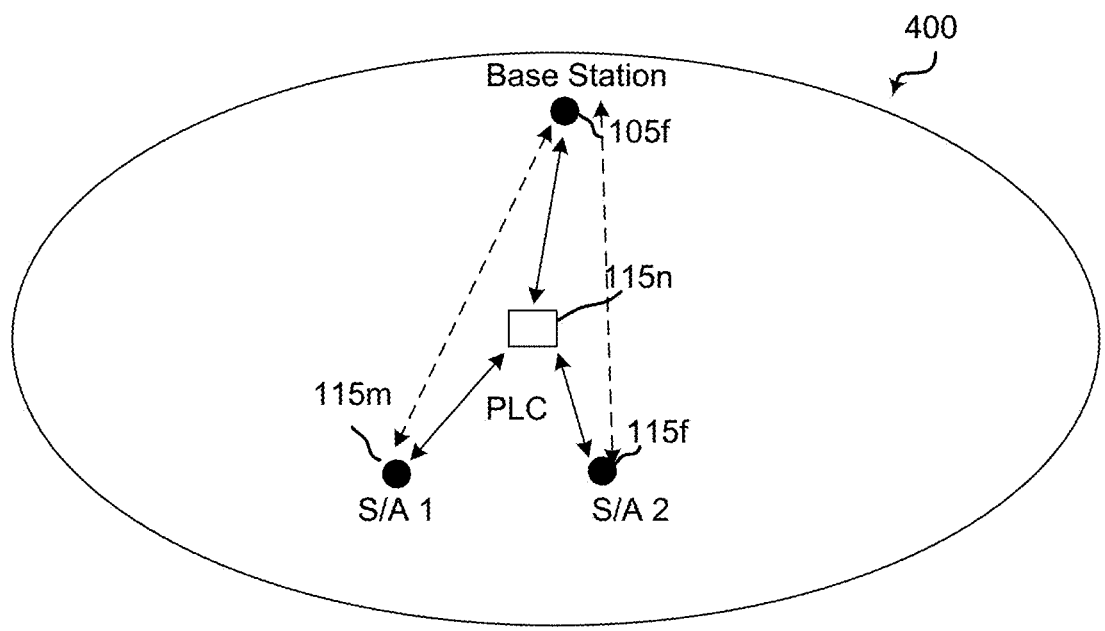
FIG. 4A is a portion of a wireless network forming an industrial environment control network.

In accordance with aspects of the present disclosure, one or more base stations are utilized in an industrial environment control network, such as for aiding in multi-hop communication links between industrial controllers and/or respective IIoT devices of the control network. For example, one or more base stations 105 of wireless network 100 may be ceiling-mounted, or otherwise disposed (e.g., wall-mounted, mounted atop a pole other structure, etc.), to provide a substantially unobstructed path one or more industrial controllers, some or all IIoT devices of a control network, etc. The example of FIG. 4A shows a portion of wireless network 100 forming industrial environment control network 400. As shown, the industrial environment control network 400 includes base station 105f (e.g., small cell base station) disposed to aid with respect to communication links with respect to multiple UEs (shown as UEs 115f, 115m, and 115n) of the control network 400.

Although the example of FIG. 4A is described above as an industrial environment control network 400 in which base station 105f includes a small cell configuration, UE 115n includes a PLC configuration, UE 115f includes a first S/A configuration, such as a thermometer sensor configuration, and UE 115m includes a second S/Z configuration, such as a robotic actuator configuration, the example configuration is merely illustrative of a control network in which concepts of the present invention may be applied. It should be appreciated that a control network may include various configurations of both base stations (e.g., macro cells, small cells, etc., or combinations thereof), industrial controller UEs, (e.g., computers, PLCs, SCADAs, etc., or combinations thereof), IIoT devices (e.g., position sensors, temperature sensors, pressure sensors, power sensors, motion detectors, proximity detectors, accelerometers, scanners, cameras, probes, switches, linear actuators, rotary actuators, servomechanism, solenoid, stepper motor, electric motor, comb drive actuators, etc., or combinations thereof). Moreover, although the example of FIG. 4A illustrates a single instance of a base station, a single instance of an industrial controller, and two instances of IIoT devices for simplicity, a control environment in which concepts of the present invention may be implemented may include different numbers of any or all of the foregoing (e.g., multiple base stations, multiple industrial controllers, and IIoT devices on the order of tens, hundreds, or even thousands).

In the example of FIG. 4A, UE 115n may include a PLC or other industrial controller providing control functionality with respect to a plurality of sensor and actuator IIoT devices (shown as including UEs 115f and 115m designated as sensor/actuator (S/A) 1 and S/A 2). UE 115n may communicate directly with base station 105f, such as using a UE to UMTS (Uu) interface. UE 115n (e.g., industrial controller) may implement sidelinks (i.e., communication links directly between UEs) with respect to UEs 115f (e.g., thermometer) and 115m (e.g., robotic actuator), such as using a UE to UE interface (e.g., a PC5 interface of a V2X mesh network). Multi-hop communication may be provided between UEs 115m and 115f and base station 105f via UE 115n. Base station 105f may additionally or alternatively establish direct communication links with various ones of the IIoT devices of a control network (e.g., UE 115f, UE 115m, etc.), such as using a Uu interface.

Existing V2X interface protocols provide for dynamic and configured grants for sidelinks (e.g., a PSCCH or PSSCH) using a PC5 interface. A DG may provide a one-time grant of sidelink resources, such as responsive to instantaneous demand/need for sidelink communication. A CG may provide a grant of sidelink resources enabling continued/periodic/repeated sidelink communication. A first type of sidelink resource grant (Type 1) of the V2X interface protocols uses RRC to configure a UE with resources of a CG. A second type of sidelink resource grant (Type 2) of the V2X interface protocols uses DCI over a PDCCH to configure a UE with resources of a DG or a CG. For example, the DCI may be a DG and provide allocation of resources to be used for sidelink communication. Alternatively, the DCI may be a CG and activate/deactivate a CG for sidelink communication.

Figure 4B:
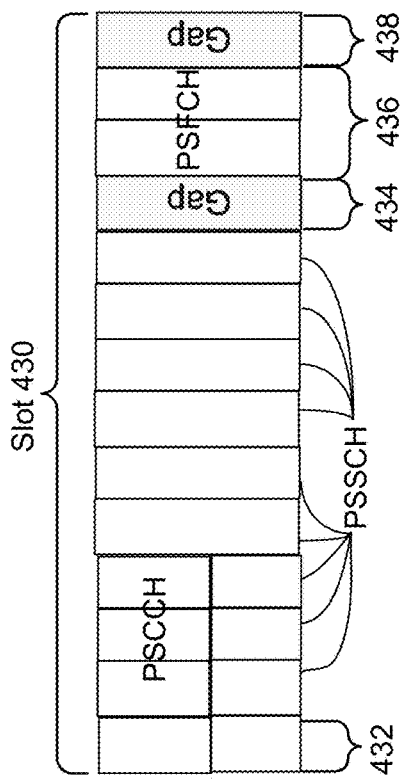
FIG. 4B is an example of a slot used for sidelink communication in the industrial environment control network of FIG. 4A.

FIG. 4B is an example of a slot 430 used for sidelink communication in the industrial environment control network of FIG. 4A. The slot 430 includes one or more symbols, such as illustrative symbols 432, 434, 436, and 438. In some implementations, the slot 430 includes forty-three symbols, as an illustrative, non-limiting example. A first symbol 432 may be configured to be used for hardware repetition and may be referred to as an ATC. Additionally, one or more symbols of the slot 430 may be configured for PSCCH, PSSCH, or combination thereof. Slots 434 and 438 are associated with gaps. One or more slots, such as a set of slot 436, may be configured for a physical sidelink feedback channel (PSFCH), which may be used to communicate ACK/NACK information.

Figure 4C:
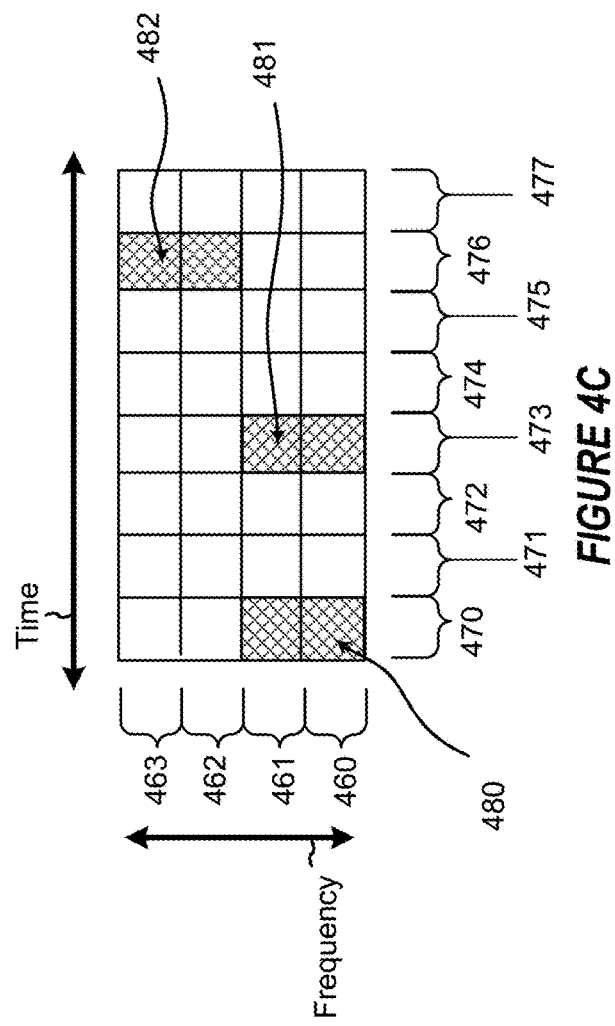
FIG. 4C is an example of subchannel reservations in the industrial environment control network of FIG. 4A.

FIG. 4C is an example of subchannel reservations in the industrial environment control network of FIG. 4A. As shown, resources are arranged in a frequency domain (frequency) and in a time domain (time). The frequency domain includes a bandwidth that is partitioned into multiple subchannels 460-463, and the time domain is partitioned into multiple slots 470-477. A TX UE, such as the UE 115n, send a PSCCH that reserves a number of subchannels of the multiple subchannels 470-477 in each of one or more slots. For example, the PSCCH may be transmitted in a subchannel, such as subchannel 460 during slot 470. In some implementations, the PSCCH may occupy a single subchannel; however PSSCH may occupy different numbers of subchannels, such as one subchannel, two subchannels, etc., or all subchannels of a bandwidth. The PSCCH may reserve resources, such as one or more subchannels, associated with one or more slots. For example, the PSCCH may indicate a first reservation 480 associated with subchannels 460 and 461 during slot 470, a second subchannels 481 associated with subchannels 460 and 461 during slot 473, and a third subchannels 482 associated with subchannels 462 and 463 during slot 476. The reservations may be utilized by the TX UE to transmit PSSCH. In some implementations, only contiguous frequency domain resource allocation is permitted, which may result in unreliable PSSCH in IIoT RF environment due to limited frequency diversity. Alternatively, in other implementations, non-contiguous frequency domain resource allocation is permitted in which a reservation includes two subchannels included in the reservation that are separated (e.g., spaced apart in the frequency domain) by at least on subchannel that is not included in the reservation. To illustrate, an example of a non-contiguous frequency domain resource allocation may include a reservation of subchannel 460 and subchannel 463 in slot 477 for TX UE to transmit PSSCH to an RX UE.

Resource allocation for sidelink communication may be performed according to one or more modes, such as a first mode (Mode 1) or a second mode (Mode 2). In the first mode (Mode 1), a base station, a base station, such as a gNB, assigns one or more resources to be used by a TX UE and an RX UE. To illustrate, the base station may transmit DCI in the Uu interface to the TX UE to grant the one or more resources to the TX UE for sideline communication. In the second mode (Mode 2), the TX UE autonomously selects the one or more resources for the sidelink communication—i.e., the base station does not assign the one or more resources. Operation of an RX UE may be the same for both the first mode (Mode 1) and the second mode (Mode 2).

Figure 5A:
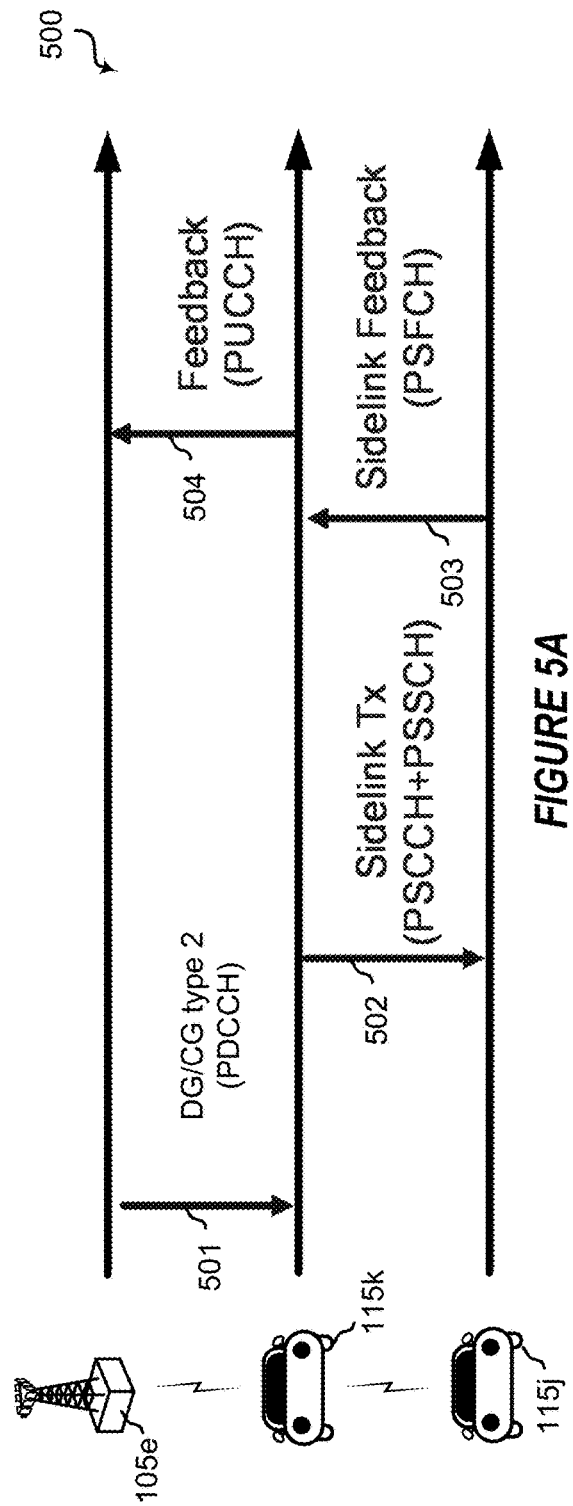
FIG. 5A is a mode 1 physical-layer procedure flow for sidelink resource grants in accordance with vehicle-to-everything (V2X) interface dynamic grant (DG)/configured grant (CG) Type 2 protocols.

FIG. 5A illustrates a Mode 1 physical-layer procedure flow (procedure flow 500) for sidelink resource grants in accordance with the above mentioned V2X interface DG/CG Type 2 protocols. Procedure flow 500 of FIG. 5A is described with reference to a V2X mesh network between UEs 115j and 115k communicating with macro base station 105e, as shown in wireless network 100 of FIG. 1. It should be understood, however, that the procedure flow may be implemented with respect to various UEs and UE configurations.

The procedure flow 500 may be an example of the first mode (Mode 1) in which resource allocation of Tx resources for sidelink communications is performed by the base station 105e through DCI 3_0. DCI 3_0 may be transmitted by the base station 105e to allocation time and frequency resources and may indicate transmission timing. The first mode (Mode 1) may support dynamic grants (DG), configured grants (CG) type 1, and CG type 2. CG type 1 may be activated via RRC signaling from the base station 105e. MCS may be decided by the TX UE, such as UE 115k, within a limit set by the base station 105e.

In procedure flow 500 of FIG. 5, base station 105a uses DCI, provided according to DCI format 3_0 and which is configured to correspond to UE 115k (e.g., sidelink TX UE), to deliver a DG/CG Type 2 to UE 115k at procedure 501. DCI format 3_0 provides fields for time gap, hybrid automatic repeat request (HARQ) process identification, new data indicator, lowest index of the subchannel allocation to the initial transmission, first-stage sidelink control information (SCI) format 0-1 fields (including frequency resource assignment and time resource assignment), physical sidelink feedback channel (PSFCH) to HARQ feedback timing indicator, and PUCCH resource indicator, as well as configuration index in the case of CG. Base station 105a prepares the DCI with a sidelink-radio network temporary identifier (SL-RNTI) for UE 115, in the case of DG, or sidelink-configured scheduling-radio network temporary identifier (SL-CS-RNTI) for UE 115k, in the case of CG, to configure the DCI to correspond to UE 115k. In particular, the cyclic redundancy check (CRC) of the DCI is scrambled by SL-RNTI or SL-CS-RNTI for UE 115k in order to deliver a DG/CG Type 2 to the UE (e.g., sidelink TX UE).

In the case of CG, UE 115k (e.g., sidelink TX UE) reports the activation (or deactivation) of a sidelink (not shown in procedure flow 500). In particular, activation/deactivation of a CG sidelink is reported through media access control-control element (MAC-CE). MAC-CE reporting is also used by UE 115k to provide sidelink buffer status reports (BSRs) to base station 105e. For example, UE 115k may have provided a BSR indicating data for sidelink communication is contained in the UE buffer, resulting in initiating the sidelink resource grant of procedure 501.

At procedure 502 of procedure flow 500, UE 115k (e.g., sidelink TX UE) uses SCI, provided according to SCI format 0-1 (e.g., for scheduling physical sidelink shared channel (PSSCH) and second-stage SCI on PSSCH) and SCI format 0-2 (e.g., for decoding PSSCH) to schedule PSSCH and transmits data through PSSCH to UE 115j (e.g., sidelink receiver (RX) UE) according to the DG/CG Type 2 (sidelink resource grant of procedure 501). SCI format 0-1 provides fields for priority, frequency resource assignment, time resource assignment, resource reservation period, demodulation reference signal (DMRS) pattern, second-stage SCI format (broadcast, unicast, groupcast), Beta_offset indicator, number of DMRS port, modulation and coding scheme (MCS), and a reserved field. SCI format 0-2 provides fields for HARQ process identification, new data indicator, redundancy version, source identification, destination identification, and channel state information (CSI) request, also if the second-stage SCI format field in the corresponding SCI provided in SCI format 0-1 indicates type 1 groupcast zone identification and communication range requirement fields are present. MCS selection is up to the sidelink TX UE (e.g., UE 115k in procedure flow 500), within limits set by the base station (e.g., base station 105e).

It can be seen from the foregoing that the base station schedules node resources for the sidelink TX UE (procedure 501) and the sidelink TX UE implements one or more sidelinks with sidelink RX UEs using some or all of the scheduled resources (procedure 502). However, the base station does not control how the sidelink TX UE uses the resources and which UEs are selected as the sidelink RX UEs by the sidelink TX UE. The existing V2X do not enable a base station making a sidelink resource grant to a sidelink TX UE to schedule sidelink resources for a specific sidelink (e.g., a sidelink between that sidelink TX UE and a specified sidelink RX UE). Additionally, existing V2X may provide a single grant for a single sidelink communication, such as a single sidelink unicast communication.

Continuing with procedure flow 500 of FIG. 5A, UE 115j (e.g., sidelink RX UE) provides sidelink feedback to UE 115k (e.g., sidelink TX UE) at procedure 503. In particular, UE 115j sends ACK/NACK on PSFCH upon receiving each transmission according to DG/CG Type 2.

At procedure 504 of procedure flow 500, UE 115k (e.g., sidelink TX UE) forwards the sidelink feedback provided by UE 115j (e.g., sidelink RX UE) to base station 105e. In particular, UE 115k forwards the ACK/NACK received from UE 115j to base station 105e on PUCCH.

Figure 5B:
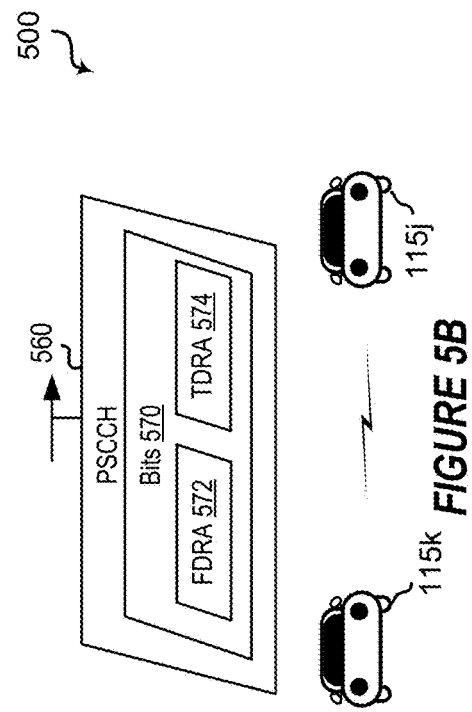
FIG. 5B is a mode 2 physical-layer procedure flow for sidelink communication.

FIG. 5B illustrates a Mode 2 physical-layer procedure flow (procedure flow 550) for sidelink resource grants in accordance with the above mentioned V2X interface. Procedure flow 550 of FIG. 5B is described with reference to a V2X mesh network between UEs 115j and 115k. It should be understood, however, that the procedure flow may be implemented with respect to various UEs and UE configurations.

In the second mode (Mode 2), the TX UE 115k performs channel sensing by blindly decoding all PSCCH channels and identifies reserved resources by other sidelink transmissions. The TX UE 115k reports available resources to an upper layer (of the TX UE 115k) and the upper layer decides resource usage.

In procedure flow 550 of FIG. 5, after a decision of the resource usage, the TX UE 115k transmits a PSCCH 560. The PSCCH 560 includes one or more bits 570, such as one or more FDRA bits 572, one or more TDRA bits 574, or a combination thereof. The PSCCH 560 can occupy up to one subchannel, such as subchannel having the lowest subchannel index. The PSCCH 560 may also include sidelink control information (SCI), such as SCI 0_1. The SCI may include information about a PSSCH bandwidth, such as FDRA bits, and one or more resource reservations in future slots, such as TDRA bits.

Additionally, in the procedure flow 550, the RX UE 115j performs blind decoding of one or more subchannels to detect the PSCCH 560. In C-V2X implementations, the number of subchannel is typically small, 1-27 subchannels and the RX UE 115J performs blind decoding in all sidelink subchannels. Because the number of subchannels is relatively small in C-V2X, it is feasible for the RX UE 115j to blind decode all sidelink subchannels. However, in other implementations, such as an IIoT implementations, the number of subchannels may be greater than 27 subchannels and it may not be feasible for the RX UE 115j to blind decode all the sidelink subchannels.

In the procedure flow 550, after transmitting the PSCCH 560, the TX UE 115k may transmit a PSSCH (not shown) to the RX UE 115j. In some implementations, the PSCCH 560 and PSSCH are transmitted within a same slot. The PSSCH can occupy up to $N_{subchannel}^{SL}$, contiguous or non-contiguous subchannels, where N is a positive integer. The PSSCH may include SCI that includes or indicates a source ID (associated with the TX UE 115k) and a destination ID (associated with the RX UE 115j), which are used to distinguish whether the packet is for the RX UE 115j and coming from which TX UE. After transmission of the PSSCH by the TX UE 115k, the RX UE 115j may transmit PSFCH to the TX UE 115k.

The PSCCH 560 may include FDRA information, such as one or more FDRA bits, which indicates the frequency location of the PSSCH. For example, the FDRA may be included in DCI, such as DCI 3_0. In some implementations, for more than one reservation, the FDRA information may also indicate a length, such as a number of subchannels or resource blocks, of the PSSCH.

A number of bits of FDRA for one or two reservations in a C-V2X implementation may be determined according to:

$$\left\lceil \log_2 \frac{N_{subchannel}^{SL}(N_{subchannel}^{SL}+1)}{2} \right\rceil,$$

where ⌈ ⌉ is a ceiling operation, log 2 is a log base 2 operation, and $N_{subchannel}^{SL}$ is a positive integer indicating a number of (available/resource pool) sidelink subchannels.

Additionally, a number of bits of FDRA for three reservation in a C-V2X implementation may be determined according to:

$$\left\lceil \log 2 \frac{N_{subchannel}^{SL}(N_{subchannel}^{SL}+1)(2N_{subchannel}^{SL}+1)}{6} \right\rceil,$$

where ⌈ ⌉ is a ceiling operation, log 2 is a log base 2 operation, and $N_{subchannel}^{SL}$ is a positive integer indicating a number of (available/resource pool) sidelink subchannels. For a large value of $N_{subchannel}^{SL}$, the FDRA can constitutes a large overhead, such as 13 bits for 2 reservations when $N_{subchannel}^{SL}=100$, and 19 bits for 3 reservations when $N_{subchannel}^{SL}=100$. The large overhead in control signaling may result in an unreliable PSCCH due to decreased coding gain.

In the C-V2X implementation, the TDRA indicates which slot which slot will be used for a future reservation, such as the second reservation or the third reservation. The TDRA for the C-V2X implementation includes 5 bits for 2 reservations, and 9 bits for 3 reservation. Accordingly, FDRA and TDRA include a total of 18 bits for 2 reservations, and 28 bits for 3 reservations. It is noted that for a single reservation in the C-V2X limitation, the TDRA bits are set to zero to indicate no additional reservations, which unnecessarily adds additional bits to the DCI.

As discussed above with reference to FIG. 3, IIoT traffic exchanged between an industrial controller and its corresponding IIoT devices is typically deterministic and periodic. Also as discussed above, low latency communication is expected with respect to the IIoT traffic. Accordingly, V2X protocols implementing DG/CG of sidelink resources may be used with respect to IIoT traffic between an IIoT device and a corresponding industrial controller in an attempt to enable low-latency communications. However, utilization of V2X protocols for PSSCH resource allocation for IIoT environments, which may include multiple sub-channels (e.g., more than 20, 30, 50, or 100 subchannels) and multiple RX UEs (such as more than 20, 50, or 100 S/As) may experience, which increases an amount of overhead traffic of the system and makes the system inefficient.

As described herein, the TX UE of FIG. 3 may supporting PSSCH resource allocation operations. For example, the sidelink resource allocation may be performed by a TX UE. The TX UE may be a PLC device. In various aspects, the TX UE may allocate a portion of a bandwidth available for a PSSCH resource and transmit, to an RX UE, a PSCCH that includes the indicator, such as a set of bits, associated with the portion. In some implementations, the portion includes two non-contiguous subchannels. In some implementations, the TX may determine a layer of multiple layers and generate the indicator based on the layer. To illustrate, the indicator may indicate a layer, a node of a layer, or both. In some implementations, the TX UE determines a subchannel group size for an allocated resource and determines the indicator based the group size. To illustrate, the indicator may include a bitmask associated with the resource pool and each bit of the bit mask corresponds to a different subchannel group. Alternatively, the indicator may be a value that corresponds to a subchannel and a group size combination. In some implementations, the TX UE determines a value of multiple values based on a subchannel location and a length for an allocated resource. The multiple values may include fewer values than a total number of subchannel and length combination for contiguous allocation, or a total number of subchannel and length combination for contiguous and non-contiguous allocation. For example, the multiple values may be determined by disabling one or more subchannel and length combination for contiguous allocation, or for contiguous and non-contiguous allocation.

Particular implementations of the subject matter described in this disclosure can be implemented to realize one or more of the following potential advantages. In some aspects, the present disclosure provides techniques for a PSSCH resource allocation. For example, the TX UE may allocate the PSSCH resource to a number of sub-channels within a resource pool, which may be a large resource pool in IIoT cases implantations. The TX UE may indicate the allocated PSSCH resource using the indicator, such as one or more bits. The number of bits of the indicator, such as a number FDRA bits, may be reduced as compared to convention techniques, such as C-V2X messaging techniques. By having a relatively low number of bits, a reliability of the PSCCH and the coding gain is maintained. Additionally, an amount of overhead message is reduced as compared to convention techniques, such as C-V2X messaging techniques. As another example, the TX UE may allocate the PSSCH resources such that a set of allocated subchannels is non-contiguous in the frequency domain. By utilizing a set of subchannels that are non-contiguous in the frequency domain, the allocation of PSSCH resources may have frequency selectivity, frequency diversity, and flexibility, such as in an IIoT implementations in which an RF environment is complex and has interference from a variety of sources (e.g., neighboring machinery).

Figure 6:
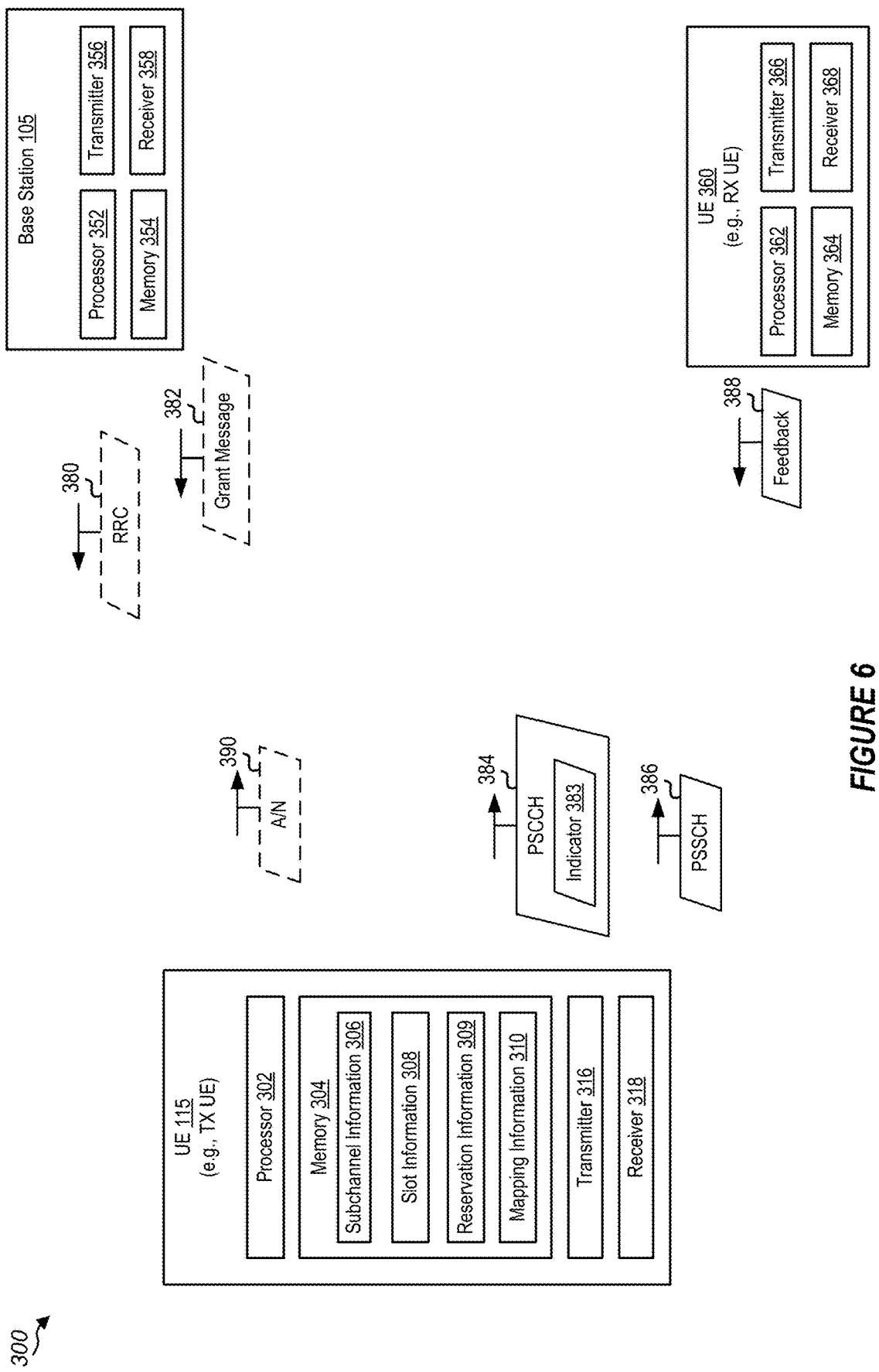
FIG. 6 is a block diagram illustrating an example wireless communication system that supports physical sidelink shared channel (PSSCH) resource allocation according to some aspects.

FIG. 6 is a block diagram of an example wireless communications system 300 that supports scheduling sidelink resources for multiple unicast messages. In some examples, the wireless communications system 300 may implement aspects of the wireless network 100 or the industrial environment control network 400. The wireless communications system 300 includes the UE 115, the base station 105, and a UE 360. Although two UEs and one base stations are illustrated, in some other implementations, the wireless communications system 300 may generally include fewer or more than two UEs 115, and may include more than one base station. In some implementations, the UE 115 may include or correspond to a TX UE, such as a PLC or PLC device. Additionally, or alternatively, the base station 105 may include or correspond to a gNB. Further, the UE 360 may include or correspond to an RX UE, such as a S/A device. For example, the UE 115, the base station 105, and the UE 360 may include or correspond to the UE 115n, the base station 105f, and the UE 115m, respectively, of FIG. 4A.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 316 (hereinafter referred to collectively as "the transmitter 316"), and one or more receivers 318 (hereinafter referred to collectively as "the receiver 318"). The processor 302 may be configured to execute instructions stored in the memory 304 to perform the operations described herein. In some implementations, the processor 302 includes or corresponds to one or more of the receive processor 258, the transmit processor 264, and the controller 280, and the memory 304 includes or corresponds to the memory 282.

In some implementations, the memory 304 is configured to store subchannel information 306, slot information 308, reservation information 309, and mapping information 310. In some implementations, the UE 115 may generate or update the subchannel information 306, the slot information 308, or the mapping information 310 based on one or more message, such as an RRC message or a grant message, received from the received from the base station 105.

The subchannel information 306 may indicate a bandwidth or bandwidth part (BWP) for sidelink communication. Additionally, or alternatively, the subchannel information 306 may indicate one or more subchannels or RBs (in the frequency domain) available for sidelink communication, such as one or more subchannels for PSSCH resource allocation. For example, the one or more subchannels may include or correspond to the subchannels 460-463 of FIG. 4C. The slot information 308 may indicate one or more slots in the time domain. The one or more slots may include or correspond to the slot 430 of FIG. 4B or the slots 470-477 of FIG. 4C. The reservation information 309 may indicate a PSSCH resource allocation, such as a subchannel, a slot or one or more symbols, a device identifier (ID) of an RX UE, or a combination there.

The mapping information 310 may include information or a data structure configured to determine an indicator 383, such as one or more bits. The mapping information 310 or the indicator 383 may indicate or be used to determine PSSCH resource allocation. To illustrate, the mapping information 310, or the indicator 383, may include or indicate as one or more subchannels, one or more slots or symbols, a starting subchannel, a length or number of subchannels, a layer or node of layer, a subchannel group or subchannel group size, a reservation, a slot or one or more symbols, a mapping mode, one or more mapping restrictions, one or more subchannel restrictions, one or more size or subchannel length restrictions, a mapping patter, or a combination thereof, as illustrative, non-limiting examples. Examples of the mapping information 310 are described further herein at least with reference to FIGS. 7, 8, 9A, 9B, or 10.

The transmitter 316 is configured to transmit reference signals, control information and data to one or more other devices, and the receiver 318 is configured to receive references signals, synchronization signals, control information and data from one or more other devices. For example, the transmitter 316 may transmit signaling, control information and data to, and the receiver 318 may receive signaling, control information and data from, the base station 105. In some implementations, the transmitter 316 and the receiver 318 may be integrated in one or more transceivers. Additionally or alternatively, the transmitter 316 or the receiver 318 may include or correspond to one or more components of the UE 115 described with reference to FIG. 2. In some implementations, the transmitter 316, the receiver 318, or both, may include or correspond to one or more interfaces. For example, the one or more interfaces may include a Uu-interface configured to enable communication with the base station 105 or a PC5 interface configured to enable communication with one or more UEs, such as the UE 360.

The base station 105 may include or correspond to a severing cell. The base station 105 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller 240, and the memory 354 includes or corresponds to the memory 242. In some implementations, the memory 354 may store information, such as the subchannel information 306, the slot information 308, the reservation information 309, the mapping information 310, the like, or a combination thereof.

The transmitter 356 is configured to transmit reference signals, synchronization signals, control information and data to one or more other devices, and the receiver 358 is configured to receive reference signals, control information and data from one or more other devices. For example, the transmitter 356 may transmit signaling, control information and data to, and the receiver 358 may receive signaling, control information and data from, the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2. In some implementations, the transmitter 356, the receiver 358, or both, may include or correspond to one or more interfaces. For example, the one or more interfaces may include a Uu-interface configured to enable communication with the UE 115.

The UE 360 may include or correspond to RX UE. The UE 360 can include a variety of components (such as structural, hardware components) used for carrying out one or more functions described herein. For example, these components can include one or more processors 362 (hereinafter referred to collectively as "the processor 362"), one or more memory devices 364 (hereinafter referred to collectively as "the memory 364"), one or more transmitters 366 (hereinafter referred to collectively as "the transmitter 366"), and one or more receivers 368 (hereinafter referred to collectively as "the receiver 368"). The processor 362 may be configured to execute instructions stored in the memory 364 to perform the operations described herein. In some implementations, the processor 362 includes or corresponds to one or more of the receive processor 258, the transmit processor 264, and the controller 280, and the memory 364 includes or corresponds the memory 282 or the memory 304. In some implementations, the memory 364 may store information, such as the subchannel information 306, the slot information 308, the reservation information 309, the mapping information 310, the like, or a combination thereof.

The transmitter 366 is configured to transmit reference signals, synchronization signals, control information and data to one or more other devices, and the receiver 368 is configured to receive reference signals, control information and data from one or more other devices. For example, the transmitter 366 may transmit signaling, control information and data to, and the receiver 368 may receive signaling, control information and data from, the UE 115. In some implementations, the transmitter 366 and the receiver 368 may be integrated in one or more transceivers. Additionally or alternatively, the transmitter 366 or the receiver 368 may include or correspond to one or more components of the UE 115 described with reference to FIG. 2. In some implementations, the transmitter 366, the receiver 368, or both, may include or correspond to one or more interfaces. For example, the one or more interfaces may include a Uu-interface configured to enable communication with the base station 105 or a PC5 interface configured to enable communication with one or more UEs, such as the UE 115.

In some implementations, the wireless communications system 300 implements a 5G New Radio (NR) network or a V2X network. For example, the wireless communications system 300 may include multiple 5G-capable UEs 115 and multiple 5G-capable base stations 105, such as UEs and base stations configured to operate in accordance with a 5G NR network protocol such as that defined by the 3GPP. Additionally, the wireless communication system 300 may include or implement aspects of a 4G network, a 3G network, a 2G network, or a combination thereof.

During operation of the wireless communications system 300, the base station 105, such as a gNB, sends an RRC message 380 or a grant message 382 to the UE 115, such as a PLC device. The grant message 382 includes may include a DCI message, such as a single DCI having a DCI 3_0 format. In some implementations, the grant message 380 includes a DG message or a CG message. Based on the RRC message 380 or the grant message 382, the UE 115 may allocate PSSCH resources. In some implementations, the UE 115 may allocate the PSSCH resources independent of the RRC message 380, the grant message 382, or both. To illustrate, the UE 115 may be configured to perform PSSCH resource allocation according to Mode 1, as described with reference to FIG. 5A, or according to Mode 2, as described with reference to FIG. 5B.

The UE 115 may allocate the PSSCH resources based on the mapping information 310. Based on the allocation of the PSSCH resources, the UE 115 may generate the indictor 383 associated with the allocation. For example, the indicator 383 may indicate or be used, by a UE, to determine the allocation of the PSSCH resources. For example, the UE 115 may determine the indicator 383 as described further herein at least with reference to one or more of FIGS. 7, 8, 9A, 9B, or 10.

Figures 7, 8:
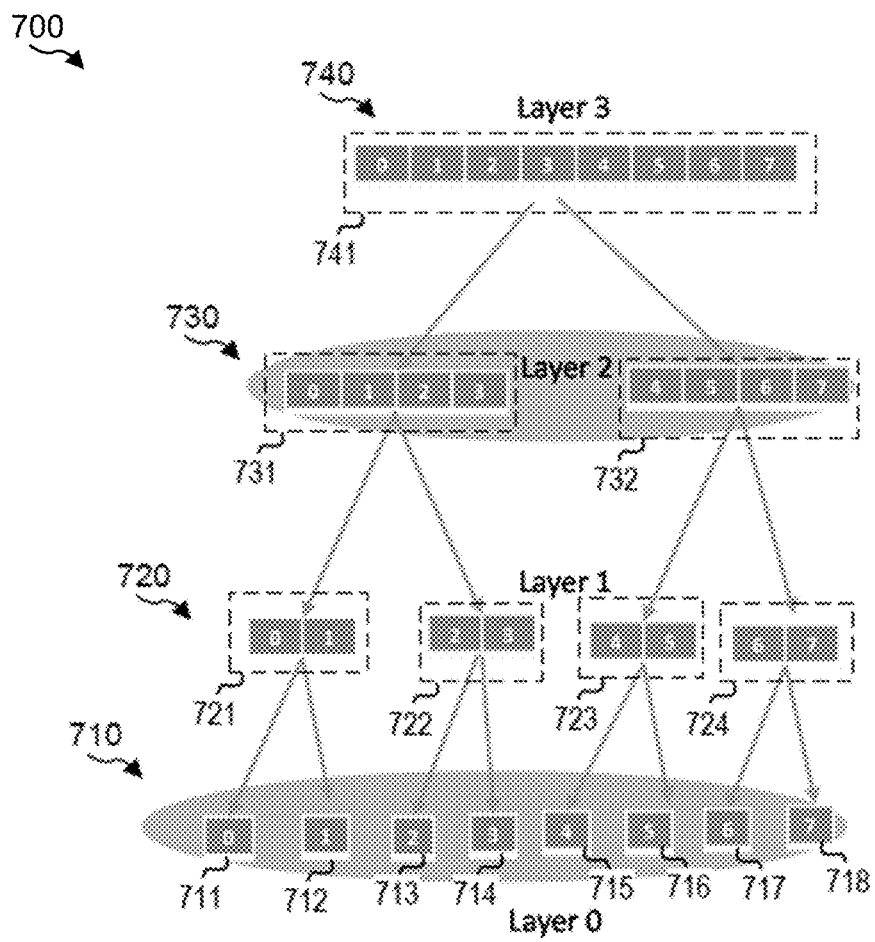
FIG. 7 is an example of a representation of a layer structure for PSSCH resource allocation.
FIG. 8 is an example of different subchannel groupings for PSSCH resource allocation.

In some implementations, the UE 115 may determine the indicator 383 using the mapping information 310, such as a layer structure. Referring to FIG. 7, FIG. 7 is an example of a representation of a layer structure 700 for PSSCH resource allocation. For example, the layer structure 700 may be a tree structure, such as a binary tree structure or another tree structure. The layer structure 700, or another layer structure, may include or correspond to the mapping information 310.

The layer structure 700 includes multiple layers, such as a first layer 710 (having a layer index value 0), a second layer 720 (having a layer index value 1), a third layer 730 (having a layer index value 2), and a fourth layer 740 (having a layer index value 3). A resource pool of the layer structure 700 include 8 subchannels (or 8 RBs), such as subchannels having subchannel index values 0-8. Although described as the resource pool having 8 subchannels, in other implementations the resource pool may include fewer or more than 8 subchannels.

Each layer of the layer structure 700 includes one or more nodes. To illustrate, the first layer 710 includes 8 nodes, such as a first node 711 (associated with a subchannel index value 0), a second node 712 (associated with a subchannel index value 1), a third node 713 (associated with a subchannel index value 2), a fourth node 714 (associated with a subchannel index value 3), a fifth node 715 (associated with a subchannel index value 4), a sixth node 716 (associated with a subchannel index value 5), a seventh node 717 (associated with a subchannel index value 6), and an eighth node 718 (associated with a subchannel index value 7). For the first layer 710, each of the nodes 711-718 may have a corresponding node index value that corresponds to its subchannel index value—e.g., the first node 711 has a node index value 0 and a subchannel index value 0, and the fifth node 715 has a node index value 5 and a subchannel index value 4.

The second layer 720 includes four nodes 721-724 that are each formed from nodes of the first layer 710. For example, the second layer 720 includes a first node 721 formed by combining the first node 711 (associated with the subchannel index value 0) of the first layer 710 and the second node 712 (associated with the subchannel index value 1) of the first layer 710, a second node 722 formed by combining the third node 713 (associated with the subchannel index value 2) of the first layer 710 and the fourth node 714 (associated with the subchannel index value 3) of the first layer 710, a third node 723 formed by combining the fifth node 715 (associated with the subchannel index value 4) of the first layer 710 and the sixth node 716 (associated with the subchannel index value 5) of the first layer 710, and a fourth node 724 formed by combining the seventh node 717 (associated with the subchannel index value 6) of the first layer 710 and the eighth node 718 (associated with the subchannel index value 7) of the first layer 710. Each node of the second layer 720 may have a corresponding node index value. To illustrate, the first node 721 has a node index value 0, the second node 722 has a node index value 1, the third node 723 has a node index value 2, and the fourth node 724 has a node index value 3.

The third layer 730 includes two nodes 731-732 that are each formed from nodes of the second layer 720. For example, the third layer 720 includes a first node 731 formed by combining the first node 721 of the second layer 720 and the second node 722 of the second layer 720, and a second node 732 formed by combining the third node 723 of the second layer 720 and the fourth node 724 of the second layer 720. Each node of the third layer 730 may have a corresponding node index value. To illustrate, the first node 731 has a node index value 0 and the second node 732 has a node index value 1.

The fourth layer 740 includes one node, such as a first node 741, that is formed from the first node 731 of the third layer 720 and the second node 732 of the third layer 730. The first node 741 of the fourth layer 740 has a node index value 0.

For each layer of the layer structure 700, a PSSCH allocation size, such as a corresponding node size for the layer, may be determine as $2^{Layer}$ where Layer is the layer index value. Each UE, such as the UE 115 and the UE 360 of FIG. 6, may be aware of the layer structure 700 or store a data representative of the layer structure 700. For example, the mapping information 310 may include data representative of the layer structure 700.

Although the layer structure 700 is arranged such that two nodes from each level are grouped into a node of a next level, other alternatives are possible. For example, a different number of nodes, such as three nodes, four nodes, or more nodes, from each level may be group to form a next level. To illustrate, nodes 711, 712, and 713 from the first layer 710 may be grouped to form one node of the second layer 720, and nodes 714, 715, and 716 from the first layer 710 may be grouped to form another node of the second layer 720. It is further noted that a node size of each node of a layer may not necessarily be the same. For example, if layer 2 has 13 subchannels, the node of layer 2 with 13 subchannels may correspond to two nodes in layer 1, a first node with 6 subchannels and a second node with 7 suchannels. In such implementations, an exact node size (i.e., how many subchannels within the node) may be determined by the layer index along with the node index.

When the layer structure 700 is used by a TX UE, such as UE 115, to determine the indicator 383, the indicator may include a fewer number of bits as compared to a number of FDRA bits for C-V2X. For example, a single reservation determines a number of bits in a C-V2X implementation may be determined according to: $\lceil \log 2 \ (1+\lceil \log 2 \ N_{subchannel}^{SL} \rceil) \rceil$, where $\lceil \ \rceil$ is a ceiling operation, log 2 is a log base 2 operation, and $N_{subchannel}^{SL}$ is a positive integer indicating a number of (available/resource pool) sidelink subchannels. For 100 subchannels, the C-V2X implementations uses 13 FDRA bits and 5 TDRA bits for a total of 18 bits. Using the layer structure 700, the 100 subchannels would correspond to 8 layers having layer index values 0-7, which may be indicated us 3 bits—e.g., "000", "001", "011", "010", "100", "101", "110", and "111". For a single reservation using the layer structure 700, the TX UE may transmit the PSCCH 384 in a single subchannel and the indicator 383 may indicate a layer of the layer structure 700. The RX UE may receive the PSCCH 384 using blind decoding and identify the subchannel in which the PSCCH 384 was received. The RX UE may determine, for the subchannel in which the PSCCH 384 was received, to which layer and which node of the layer the subchannel corresponds. For example, the RX UE may determine the layer based on the indicator 383 and, for the identified layer, may determine the node based on the determined layer. To illustrate, the RX UE may receive the PSCCH 384 in a subchannel having subchannel index value 3. If the indicator 383 indicates the second layer 720, the RX UE determines that the second node 722 of the second layer 720 is allocated as a PSSCH resource. Alternatively, If the indicator 383 indicates the third layer 730, the RX UE determines that the first node 731 of the third layer 730 is allocated as a PSSCH resource. Accordingly, for 100 subchannels and a single reservation, the layer structure 700 uses 3 bits as compared to the C-V2X implementation which uses 13 FDRA (and 18 total bits for FDRA and TDRA).

In some implementations, the TX UE may indicate a node other than the node in which the PSCCH is received. The other node may be solely allocated for the PSSCH resource or may be allocated in addition to the node in which the PSCCH is received. The TX UE may indicate the node using a number of bits based on the total number of subchannels. For 100 subchannels, the TX UE would include an additional 7 bits to indicate the other node, so that when the lowest layer is used the TX UE can identify an individual node (e.g., an individual subchannel). As compared to a C-V2X implementation for 2 reservations and 100 subchannels, the layer structure uses 10 bits (e.g., 3 bits to indicate a layer and 7 bits identify a node for the second reservation) as compared to 13 FDRA bits in a C-V2X implementation. As compared to a C-V2X implementation for 3 reservations and 100 subchannels, the layer structure uses 17 bits (e.g., 3 bits to indicate a layer, 7 bits identify a node for the second reservation, and 7 bits identify a node for the third reservation) as compared to 19 FDRA bits in a C-V2X implementation. For the 8 subchannels of the layer structure 700, the TX UE would include 3 additional bits. To illustrate, the TX UE may transmit the PSCCH 384 in a subchannel having subchannel index value 2 and the indicator 383 may include six bits having a value of "001011". The first three bits "001" of "001011" may indicate the second layer 720 and the PSCCH was received in the second node 722 of the second layer 720. The last three bits "011" of "001011" may indicate a node index value 3 corresponding to the fourth node 724 of the second layer 720. Accordingly, the indicator 383 having the value "001011" may allocate the fourth node 724 of the second layer 720 for the PSSCH resource, or may allocate the second node 722 and the fourth node 724 of the PSSCH resource.

In some implementations, each node may be individually designated. To illustrate, tor the 8 subchannels of the layer structure 700, the layer structure includes a total of 15 nodes. The 15 nodes may be individually identified using 4 bits. To illustrate, the node 711 corresponds to a value of "0000", the node 712 corresponds to a value of "0001", the node 713 corresponds to a value of "0010", the node 714 corresponds to a value of "0011", the node 715 corresponds to a value of "0100", the node 716 corresponds to a value of "0101", the node 717 corresponds to a value of "0110", the node 718 corresponds to a value of "0111", the node 721 corresponds to a value of "1000", the node 722 corresponds to a value of "1001", the node 723 corresponds to a value of "1010", the node 724 corresponds to a value of "1011", the node 731 corresponds to a value of "1100", the node 732 corresponds to a value of "1101", and the node 741 corresponds to a value of "1110". Accordingly, for two reservations, the indicator 383 may include 7 bits in which the first three bits may indicate a layer and the next four bits indicate a node for the second reservation. For three reservations, the indicator 383 may include 11 bits in which the first three bits may indicate a layer, the next four bits indicate a node for the second reservation, and the following four bits indicate a node for the third reservation.

In some implementations in which each node of the layer structure is individually designated, the layer structure may be associated with 100 subchannels. For 100 subchannels, the layers may be represented using 3 bits and the structure may include a total 202 nodes which may be individually identified using 8 bits. Accordingly, for two reservations assocated with 100 subchannels, the indicator 383 may include 11 bits in which the first three bits may indicate a layer and the next eight bits indicate a node for the second reservation. For three reservations, the indicator 383 may include 19 bits in which the first three bits may indicate a layer, the next eight bits indicate a node for the second reservation, and the following eight bits indicate a node for the third reservation.

In some implementations, the TX UE may transmit a PSCCH to a lowest subchannel index of the node for the layer in which the PSCCH is transmitted. To illustrate, when the second layer 720 is selected, the TX UE may transmit the PSCCH in the first node 721 at the subchannel index 0, in the second node 722 at the subchannel index 2, in the third node 723 at the subchannel index 4, or in the fourth node 724 at the subchannel index 6. As another example, when the third layer 730 is selected, the TX UE may transmit the PSCCH in the first node 731 at the subchannel index 0, or in the second node 732 at the subchannel index 4. Accordingly, when using the layer structure 700, subchannels having subchannel index values 0 or 4 are more likely to have the PSCCH. In other implementations, the PSCCH may located in any subchannel of the node (for a particular layer) in which the PSCCH is included, which may provide more freedom and system flexibility as compared to including the PSCCH in a lowest subchannel index of the node for the layer in which the PSCCH is transmitted.

In some implementations, the layer structure 700 may be used for multiple transmissions, such as two or more reservations for PSSCH. In such implementations, the allocation size, such as the layer, may be the same for each reservation. For two reservations using a layer structure, the number of bits needed may be determined as: $\lceil \log 2 \ (2^{NumLayer}-1) \rceil +$ $\lceil \log 2 \ (1+\lceil \log 2 \ N_{subchannel}^{SL} \rceil) \rceil$, where the term $\lceil \log 2 \ (2^{NumLayer}-1) \rceil$ is associated with a number of bits needed to indicate the node of second reservation, the term $\lceil \log 2 \ (1+\lceil \log 2 \ N_{subchannel}^{SL} \rceil) \rceil$ is associated with a number of bits needed for a single reservation, $\lceil \ \rceil$ is a ceiling operation, log 2 is a log base 2 operation, NumLayer is a positive integer indicating a total number of layers, and $N_{subchannel}^{SL}$ is a positive integer indicating a number of (available/resource pool) sidelink subchannels. As compared to a C-V2X implementation for 2 reservations and 100 subchannels, the layer structure uses 11 bits (e.g., 3 bits to indicate a layer and 8 bits identify an individually identifiable node) as compared to 13 FDRA bits in a C-V2X implementation. For three reservations using a layer structure, the number of bits needed may be determined as: $\lceil \log 2 \ (2^{NumLayer}-1) \rceil + \lceil \log 2 \ (4^{NumLayer}-1) \rceil$, where the term $\lceil \log 2 \ (2^{NumLayer}-1) \rceil$ is associated with a number of bits needed to indicate the node(s) of second and third reservations, the term $\lceil \log 2 \ (1+\lceil \log 2 \ N_{subchannel}^{SL} \rceil) \rceil$ is associated with a number of bits needed for a single reservation, $\lceil \ \rceil$ is a ceiling operation, log 2 is a log base 2 operation, NumLayer is a positive integer indicating a total number of layers, and $N_{subchannel}^{SL}$ is a positive integer indicating a number of (available/resource pool) sidelink subchannels. As compared to a C-V2X implementation for 3 reservations and 100 subchannels, the layer structure uses 19 bits (e.g., 3 bits to indicate a layer, 8 bits identify an individually identifiable node for the second reservation, and 8 bits identify an individually identifiable node for the third reservation), which as the same as 19 FDRA bits in a C-V2X implementation.

In some implementations, a layer structure include 120 subchannels and each node may be individually identifiable. As compared to a C-V2X implementation for 2 reservations and 120 subchannels, the layer structure uses 11 bits as compared to 13 FDRA bits in a C-V2X implementation. As compared to a C-V2X implementation for 3 reservations and 120 subchannels, the layer structure uses 19 bits as compared to 20 FDRA bits in a C-V2X implementation.

In some implementations, reservations may have different allocation sizes, such as being associated with nodes of different layers. For example, referring to the layer structure 700, a first reservation may be associated with the third layer 730 and a second reservation may be associated with the second layer 720. To illustrate, the indicator 383 may include 3 bits (e.g., "010") to indicate the third layer 730, 3 bits (e.g., "001") to indicate the second layer 720, and 3 bits (e.g., "010") to indicate the third node 723. As another example, referring to the layer structure 700, a first reservation may be associated with the fourth layer 740 and a second reservation may be associated with the first layer 710. To illustrate, the indicator 383 may include 3 bits (e.g., "011") to indicate the fourth layer 740, 3 bits (e.g., "000") to indicate the first layer 710, and 3 bits (e.g., "111") to indicate the eighth node 718. Allowing different allocation sizes may result in the indicator 383 including more bits for future reservations, but, for an IIoT implementation, may increase efficiency and flexibility, such as flexibility of reserving future resources for new transmission depending on a channel condition, a buffer status, a resource usage of the resource pool, or a combination thereof, as illustrative, non-limiting examples.

In some implementations, to reduce a number of bits needed for using a layer structure, such as the layer structure 700, one or more subchannels, nodes, or layers may be omitted from the layer structure. For example, the lowest layer of a layer structure may be omitted such that subchannels are not individually allocated for as a PSSCH resource.

Additionally or alternatively, subchannels having an odd (or even) subchannel index value, or nodes having an odd (or even) node index value may be omitted from the layer structure. Additionally, or alternatively, subchannels or nodes may be omitted that have a corresponding subchannel index value or node index value that is a multiple of Y, where Y is a positive integer, such a 3 or 4. Reducing a number of subchannels, nodes, or layers may reduce a number of bits while sacrificing some resource allocation flexibility.

In some implementations, the UE 115 may determine the indicator 383 using the mapping information 310, such as subchannel group information. Referring to FIG. 8, FIG. 8 is an example of different subchannel groupings 800 for PSSCH resource allocation. One or more subchannel groupings (SCGs) may include or correspond to the mapping information 310. The PSSCH resource allocation may be performed based on one or more subchannel groups as described herein.

The available subchannels may be divided into groups. For example, as shown in FIG. 8, six subchannels having subchannel indexes 0-5 may be divided into group based on a subchannel group size. For example, a subchannel group size of 2 may result in three subchannel groups having subchannel group index values 0-2. As another example, a subchannel group size of 3 may result in two subchannel groups having subchannel group index values 0-1. The subchannel group size can be configured or preconfigured using RRC signaling, such as the RRC message 380, depending on the bandwidth part or the resource pool.

In a first implementation of the SCGs, the indicator 383 may include a bit map in which bits of the bit map correspond to different groups and a value of each bit indicates whether the corresponding subchannel group is allocated for a PSSCH resource. To illustrate, a bit value of 1 may indicate to that a corresponding subchannel is allocated as a PSSCH resource and a bit value of 0 may indicate that a corresponding subchannel is not allocated as a PSSCH resource. Alternatively, a bit value of 0 may indicate to that a corresponding subchannel is allocated as a PSSCH resource and a bit value of 1 may indicate that a corresponding subchannel is not allocated as a PSSCH resource. A number of bits included in the bitmap may be determined as: $\lceil \log_2 N_{PSSCH}^{max}/\text{SCGSize} \rceil$, where $\lceil \ \rceil$ is a ceiling operation, log 2 is a log base 2 operation, $N_{PSSCH}^{max}$ is a positive integer indicating a maximum PSSCH allocation size, and SCGSize is a positive integer indicating a subchannel group size. The first implementation of the SCGs may have full flexibility in term of resource allocation and can enable some frequency diversity by allowing non-contiguous subchannel allocation.

It is noted that depending on the resource pool size the lowest group or the upper most group may have different sizes (i.e., a total number of subchannels is not have be an integer multiple of the group size). Additionally, in an implementations in which the PSCCH is always blind decoded within the lowest subchannel, a partial bitmap having a reduced number of bits may be transmitted. For example, a bit corresponding to the PSCCH may be omitted and the bitmap can include only bits that represent relevant subchannels with larger indexes than subchannel for the PSCCH. However, for multiple reservations, the full bit map (or relative offset) may be included for each additional reservation. To illustrate, for two reservations, the indicator 383 may include a first bitmap, such as a full or partial bitmap, for the first reservation and a second bitmap, such as a full bitmap, for the second reservation.

In a second implementation of the SCGs, the indicator 383 may include a value representative of a starting subchannel index value and a corresponding subchannel group size (e.g., length). Different SCG sizes may be supported, such as SCG sizes 1, 2, 8, 10, or a combination thereof, as illustrative, non-limiting examples. The second implementation of SCGs may be similar to the layer structure approach (described above) in that different allocation sizes are permitted, however, the second implementation of the SCGs provide more control of selecting the group size and is not limited based on the layer structure. For example, in the binary layer structure of the layer structure 700, an allocation size is determined or limited by $2^{Layer}$. It is noted that the second implementation of the SCGs may support contiguous resource allocation or non-contiguous resource allocation, or both. For a non-contiguous implementation, a number of bits may be determined by: $\lceil \log_2 (N_{subchannel}^{SL} \times numSupportedSCGSize) \rceil$, where $\lceil\ \rceil$ is a ceiling operation, log 2 is a log base 2 operation, $N_{subchannel}^{SL}$ is a positive integer indicating a total number of subchannels available for PSSCH allocation, and SCGSize is a positive integer indicating a subchannel group size.

In some implementations of the SCGs, a TX UE, such as the UE 115, may use either of the first implementation of the SCGs or the second implementations of the SCGs. For example, the TX UE may dynamically switch between the first implementation of the SCGs or the second implementations of the SCGs. To illustrate, the indicator 383 may include an additional bit to indicate whether the whether the TX UE is using (e.g., signaling) the first implementation of the SCGs or the second implementations of the SCGs. The additional bit may be included as a most significant bit, a least significant bit, or other bit of the indicator 383.

Figure 9A:
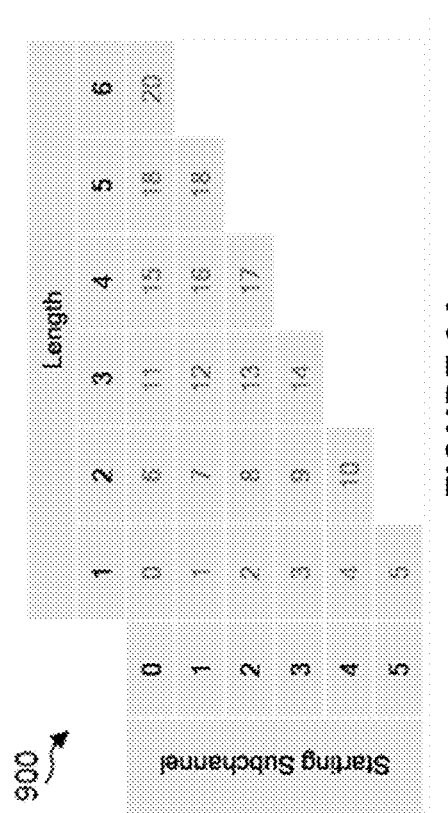
FIGS. 9A and 9B are examples of data structures for subchannel and length mapping information for PSSCH resource allocation.
Figure 9B:
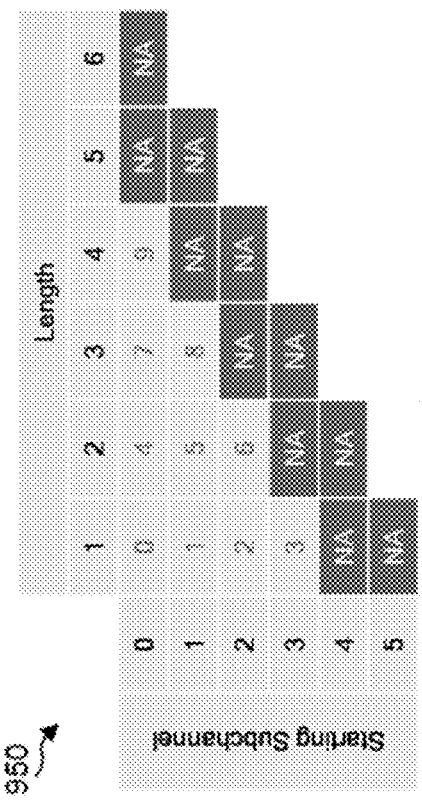

In some implementations, the UE 115 may determine the indicator 383 using the mapping information 310, such as a data structure for subchannel and length mapping. FIGS. 9A and 9B are examples of data structures for subchannel and length mapping information for PSSCH resource allocation. FIG. 9A is an example of a first data structure 900 and FIG. 9B is an example of a second data structure 950. The first data structure 900, the second data structure 950, or both, may be included in the mapping information 310. The first data structure 900 and the second data structure 950 may be based on start length encoding and may be partial tables which may each be referred to as a partial resource indication value (RIV) table. Each value of the table may map to a corresponding starting subchannel and a corresponding length. As shown, each of the first data structure 900 and the second data structure 950 are associated with continuous resource allocation and do not support non-contiguous resource allocation. For example, the start length encoding shown in FIGS. 9A and 9B has a triangle structure that does not allow long non-contiguous locations, such as a starting position at subchannel index value 5 with a length of 2 because the resource allocation would cross the resource pool—i.e., cross the resource pool to the subchannel index value 0. In other implementations, non-contiguous resource allocation may be supported, as described further herein at least with reference to FIG. 10.

For a single reservation, a TX UE determines or selects a data structure, such as the first data structure 900 or the second data structure 950, and determines a value of the selected data structure corresponding to a starting subchannel and length for resource allocation. The determined value is included in the indicator 383 and represented as a binary value including a number of bits. The first data structure 900 includes values 0-20 and requires 5 bits. The second data structure 950 include values 0-9 and requires 4 bits. The TX UE may determine a value from the selected data structure for each reservation.

As compared to the first data structure 900, the second data structure 950 results in fewer bits included in the indicator 838. To reduce the number of bits and generate the second data structure 950, one or more entries of the first data structure 900 may be disabled. The disabled entries may be randomly selected or selected according to a pattern or scheme. Additionally, or alternatively, the disabled entries may be preconfigured or dynamically configured via RRC signaling, such as the RRC message 380. In FIG. 9B, the second data structures shows entries disabled based on a pattern, such as disabling the two longest diagonal bits. After disabling the one or more entries, the remaining entries may be renumbered. As another example, one or more staring subchannel option, one or more length options, or a combination thereof may be disabled. To illustrate, the length options for 1, 4, 5, and 6 may be disabled. Additionally, or alternatively, the subchannel 4 may be disabled as a starting subchannel.

In some implementations, the TX UE may being with the first data structure 900 and may modify the first data structure 900 to generate the second data structure 950. Alternatively, the TX UE may receive or determine a set of values of a total number of combinations of starting subchannels and lengths for contiguous resource allocation or for both contiguous and non-contiguous resource allocation. The set of values may include a number of values that is less than the total number of combinations.

Figure 10:
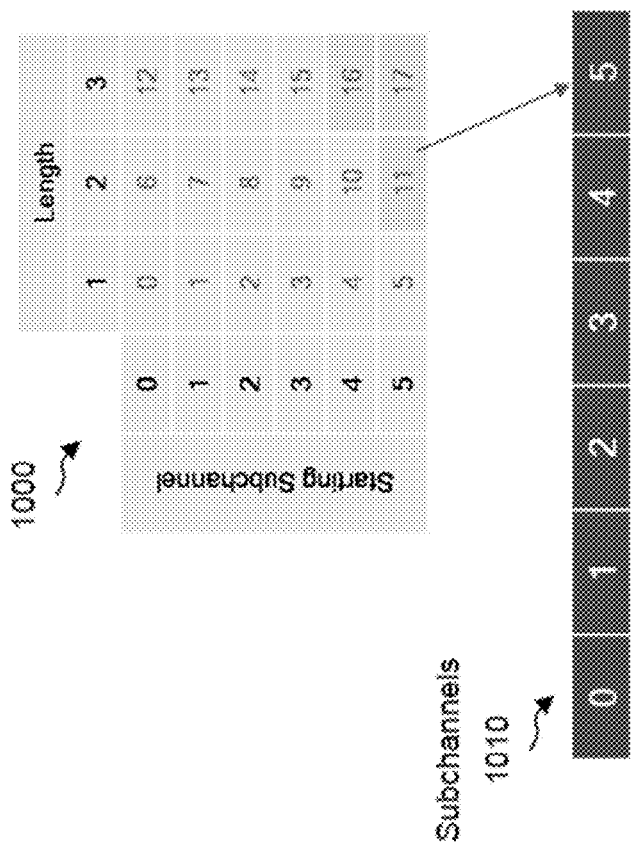
FIG. 10 is an example of a data structure for subchannel and length mapping information that support non-contiguous subchannel allocation for PSSCH resource allocation.

FIG. 10 is an example of a data structure for subchannel and length mapping information that support non-contiguous subchannel allocation for PSSCH resource allocation. The data structure 1000 may be included in the mapping information 310. The data structure 1000 be based on start length encoding and may support non-contiguous resource allocation. For example, if subchannels having index values 1-4 are allocated to a first RX UE and the TX UE needs 2 subchannels to send data to a second RX, as shown in FIG. 10, the TX UE may identify a value of 10 from the data table 1000, such that resources assigned for the second RX UE start at the subchannel index value 5 of the multiple subchannels 1010 and "wrap around" to also include the subchannel index value 0. The identified value—e.g., the value 10— may be included in the indicator 383. As another example, to support a maximum PSSCH of 4 out of 100 sidelink subchannels, a number of bits may be determined by: $\log_2 N_{PSSCH}^{max} \times N_{subchannel}^{SL}$, where log 2 is a log base 2 operation, $N_{PSSCH}^{max}$ is a positive integer indicating a maximum PSSCH allocation size, and $SN_{subchannel}^{SL}$ is a positive integer indicating a total number of subchannels available for PSSCH allocation. For the maximum PSSCH of 4 out of 100 SL subchannels, bits 9 bits are needed as compared instead of 19 bits in current V2X By supporting non-contiguous resource allocation, allocation of the PSSCH resource may have more degrees of freedom and it may be possible to avoid resource collision, such as when operating in Mode 2 (as described with reference to FIG. 5). Additionally, or alternatively, by supporting non-contiguous resource allocation, it may be possible to use a search space (SS) design in which a PSCCH may be located at in a subchannel other than the subchannel having the lowest subchannel index value, in which non-contiguous resource allocation can support flexible PSSCH resource allocation inside a search space that is configured to a UE without causing interference to subchannel that is in another search space of another UE, or both.

The data structure 1000 is shown as supporting lengths 1-3, however, the data structure 1000 may be configured to support any combination of lengths 1-6. To illustrate, for the multiple subchannels 1010 having subchannel indexes 0-5, the data structure 1000 may be all combinations of subchannel index values 0-6 and lengths 1-6. Alternatively, the data structure 1000 may be configured to include less than all possible combination, such as by disabling one or more entries as described with reference to FIGS. 9A and 9B. By using the data structure 1000 that supports non-contiguous resource allocation, a number of bits included in the indicator 383 may increase, but flexibility of allocating resources may be increased as compared to 18 bits which would be needed for C-V2X in which non-contiguous resource allocation is not permitted or 19 bits which would be needed for C-V2X in which non-contiguous resource allocation (e.g., wrap-around is supported) is permitted.

Referring to FIG. 6, the UE 115 may generate the PSCCH 384 that includes the indicator 383. The UE 115 transmits the PSCCH 384 to the UE 360. After sending the PSCCH 384, the UE 115 transmits one or more PSSCH 386 according to the PSSCH resource allocation associated with the indicator 383.

The UE 360 receives the PSCCH 384 from the UE 115. For example, the UE 360 may perform blind decoding to detect the PSCCH 384. The UE 360 identifies the indicator 383 included in the received PSCCH 384 and determines the PSSCH resource allocation based on the indicator 383. For example, the UE 360 may use the mapping information 310 stored at the memory 364 of the UE 360 to determine the PSSCH resource allocation. The UE 360 may determine, based on the PSCCH 384 (e.g., the indicator 383), a set of one or more subchannels, a set of one or more slots, or a combination thereof, associated with the PSSCH 386. Based on the determined PSSCH resource allocation, the UE 360 may monitor for and receive the PSSCH 386.

In some implementations, the UE 115 may receive a feedback message 388, such as an ACK/NACK (A/N) message, from the UE 360. Based on the received feedback message 388, the UE 115 may transmit a feedback message, such as A/N message 382, to the base station 105. The A/N message 382 may be responsive to the grant message 386. In some implementations, the A/N message 382 may be used, such as by the base station 105, to determine additional resources requested by the UE 115.

As described with reference to FIG. 6, the present disclosure provides techniques for a PSSCH resource allocation. For example, the UE 115 may allocate the PSSCH resource to a number of sub-channels within a resource pool, which may be a large resource pool in IIoT cases implantations. The UE 115 may indicate the allocated PSSCH resource using the indicator 383, such as one or more bits. The number of bits of the indicator 383, such as a number FDRA bits, may be reduced as compared to convention techniques, such as C-V2X messaging techniques. By having a relatively low number of bits, a relatability of the PSCCH and the coding gain is maintained. Additionally, an amount of overhead message is reduced as compared to convention techniques, such as C-V2X messaging techniques. As another example, the UE 115 may allocate the PSSCH resources such that a set of allocated subchannels is non-contiguous in the frequency domain. By utilizing a set of subchannels that are non-contiguous in the frequency domain, the allocation of PSSCH resources may have frequency selectivity, frequency diversity, and flexibility, such as in an IIoT implementations in which an RF environment is complex and has interference from a variety of sources (e.g., neighboring machinery).

FIG. 11 is a flow diagram illustrating an example process 1100 that supports PSSCH resource allocation according to some aspects. Operations of the process 1100 may be performed by a UE, such as the UE 115 described above with reference to FIG. 1, 2, or 6, the UE 115n of FIG. 4, or the UE 115k of FIG. 5. For example, example operations (also referred to as "blocks") of the process 1100 may enable the UE to perform PSSCH resource allocation.

In block 1102, the UE selects a layer of multiple layers of a layer structure. Each layer includes one or more nodes and is associated with a bandwidth including multiple subchannels available for a PSSCH resource. In some implementations, the layer structure may be associated with a tree structure. For example, the layer structure may be a binary tree structure. Additionally, or alternatively, each layer of the multiple layers may be associated with a different node size of one or more nodes of the layer. A node size of the layer may be determined based on a layer index value of the layer. The layer structure may include or correspond to the layer structure as described at least with reference to FIG. 7. In some implementations, at least one layer of the multiple layers corresponds to fewer than all subchannels of the multiple subchannels.

In block 1104, the UE allocates, based on the selected layer, a first portion of the bandwidth for a PSSCH. The PSSCH may include or correspond to the PSSCH 386.

In block 1106, the UE transmits, to an RX UE, a PSCCH that includes an indicator associated with the allocated first portion. In some implementations, the indicator indicates the selected layer. Additionally, or alternatively, the indicator may include a set of one or more bits. The RX UE may include or correspond to the UE 360. The PSCCH and the indicator may include or correspond to the PSCCH 384 and the indicator 383. In some implementations, the PSCCH includes the indicator in a FDRA field. Additionally, or alternatively, indicator includes an FDRA (e.g., one or more FDRA bits), a TDRA (e.g., one or more TDRA bits), or a combination thereof. In some implementations, the PSCCH is transmitted in a node of the selected layer in a subchannel of the node having a lowest subchannel index value.

In some implementations, the first portion corresponds to a first PSSCH reservation. The UE may allocate, based on the selected layer, a second portion of the bandwidth for another PSSCH. In some implementations, the first portion and the second portion may have the same allocation size. Additionally, or alternatively, the indicator may be associated with the first portion and the second portion. In some implementations, the UE may select another layer of the multiple layers. The other layer may be different from the layer associated with the first portion. The UE also may allocate, based on the other selected layer, a second portion of the bandwidth for another PSSCH. The second portion may correspond to a second PSSCH reservation.

FIG. 12 is a flow diagram illustrating an example process 1200 that supports PSSCH resource allocation according to some aspects. Operations of the process 1200 may be performed by a UE, such as the UE 115 described above with reference to FIG. 1, 2, or 6, the UE 115n of FIG. 4, or the UE 115k of FIG. 5. For example, example operations (also referred to as "blocks") of the process 1200 may enable the UE to perform PSSCH resource allocation.

In block 1202, the UE determines a subchannel group size associated with a bandwidth including multiple subchannels available for a PSSCH resource. As illustrative, non-limiting examples, the group size may be associated with two subchannels or three subchannels. The multiple subchannels may be divided into multiple subchannel groups based on the subchannel group size. The subchannel group size may include or correspond to the subchannel group size as described at least with reference to FIG. 8. The PSSCH may include or correspond to the PSSCH 386.

In block 1204, the UE allocates, based on the determined subchannel group size, a first portion of the bandwidth for a PSSCH. In block 1206, the UE transmits, to an RX UE, a PSCCH that includes an indicator associated with the allocated first portion. The RX UE may include or correspond to the UE 360. The PSCCH and the indicator may include or correspond to the PSCCH 384 and the indicator 383. In some implementations, the indicator includes a bitmap associated with the first portion. The bitmap may include a bit for each subchannel group of the multiple subchannel groups. Alternatively, a portion of the bitmap associated with the first portion may include a number of bits that is less than a number of subchannel groups of the multiple subchannel groups.

In some implementations, the first portion corresponds to a first PSSCH reservation. The UE may allocate, based on the determined subchannel group size, a second portion of the bandwidth for another PSSCH. The second portion may include or correspond to a second PSSCH reservation. The first portion and the second portion may have the same allocation size. Additionally, the indicator may be associated with the first portion and the second portion. In some implementations, the indicator includes the bitmap associated with the first portion and a second bitmap or an offset associated with the second portion.

In some implementations, the indicator includes a value associated with the first portion.

The value may correspond to a subchannel location and a subchannel group size for an allocated resource. Additionally, or alternatively, the value may be selected from multiple values. Each value of the multiple values may correspond to a subchannel location and a subchannel group size. The multiple values are included in a mapping table of subchannel locations and subchannel group sizes. For example, the mapping table may include or correspond to the mapping information 310. The mapping table may support non-contiguous resource allocation. In some implementations, the indicator includes a first portion having a value that indicates whether a second portion of the indicator is associated with a bitmap or a mapping value.

FIG. 13 is a flow diagram illustrating an example process 1300 that supports PSSCH resource allocation according to some aspects. Operations of the process 1300 may be performed by a UE, such as the UE 115 described above with reference to FIG. 1, 2, or 6, the UE 115*n* of FIG. 4, or the UE 115*k* of FIG. 5. For example, example operations (also referred to as "blocks") of the process 1300 may enable the UE to perform PSSCH resource allocation.

In block 1302, the UE identifies multiple values associated with allocation of a bandwidth including multiple subchannels available for a PSSCH resource. Each value corresponds to a subchannel location and a length. Additionally, the multiple values include fewer values than a total number of subchannel and length combinations based on the multiple subchannels. The multiple values may include or correspond to the mapping information 310 or one of the data structure of FIGS. 9A, 9B, or 10.

In some implementations, the total number of subchannel and length combinations are associated with non-contiguous resource allocation of the multiple subchannels. Alternatively, the total number of subchannel and length combinations are associated with contiguous and non-contiguous resource allocation of the multiple subchannels, and at least one value of the multiple values corresponds to a non-contiguous resource allocation of two subchannels.

In block 1304, the UE determines a value of the multiple values to allocate a first portion of the bandwidth for a PSSCH. In block 1306, the UE transmits, to an RX UE, a PSCCH that includes an indicator associated with the allocated first portion. The RX UE may include or correspond to the UE 360. The PSCCH and the indicator may include or correspond to the PSCCH 384 and the indicator 383.

In some implementations, the UE receives an RRC message from a base station. For example, the RRC message and the base station may include or correspond to the RRC message 380 and the base station 105. The RRC message may be associated with the multiple values. In some implementations, the RRC message indicates the multiple values. Additionally, or alternatively, the RRC message may indicate one or more values to be disabled of a total amount of values corresponding to the total number of subchannel and length combinations.

In some implementations, the UE disables one or more values of a total amount of values corresponding to the total number of subchannel and length combinations to generate the multiple values. The one or more values that are disabled may be selected randomly, based on a pattern, based on a subchannel, based on a length, or a combination thereof In some implementations, the first portion corresponds to a first PSSCH reservation. The UE may determine another value of the multiple values to allocate a second portion of the bandwidth for another PSSCH. The indicator, such as the indicator 383, may be associated with the first portion and the second portion. Additionally, or alternatively, the second portion may correspond to a second PSSCH reservation.

FIG. 14 is a flow diagram illustrating an example process 1400 that supports PSSCH resource allocation according to some aspects. Operations of the process 1400 may be performed by a UE, such as the UE 115 described above with reference to FIG. 1 or 2, the UE 115*f* or 115*m* of FIG. 4, the UE 115*j* of FIG. 5, or the UE 360 of FIG. 6. For example, example operations (also referred to as "blocks") of the process 1400 may enable the UE to perform sidelink resources scheduling for unicast messaging.

In block 1402, the UE allocates a first portion of a bandwidth including multiple subchannels available for a PSSCH resource. The first portion may include two non-contiguous subchannels. For example, the first portion may include a first subchannel and a second subchannel, where the first subchannel is separated from the separate subchannel by one or more subchannels of the multiple subchannels.

In block 1404, the UE transmits, to an RX UE, a PSCCH that includes an indicator associated with the first portion for a PSSCH. The RX UE may include or correspond to the UE 360. The PSCCH and the indicator may include or correspond to the PSCCH 384 and the indicator 383. The PSSCH may include or correspond to the PSSCH 386. In some implementations, the UE may transmit the PSSCH in the first portion during a first slot. Additionally, or alternatively, the PSCCH may be transmitted during the first slot.

In some implementations, the indicator includes a set of one or more bits. Additionally, or alternatively, the indicator may be associate with SCI. In some implementations, the indicator includes an FDRA (e.g., one or more FDRA bits), a TDRA (e.g., one or more TDRA bits), or a combination thereof In some implementations, to allocate the first portion, the UE may determine a subchannel group size associated with a bandwidth including multiple subchannels available for a PSSCH resource. For example, the first portion may be allocated based on the determined subchannel group size. Additionally, or alternatively, the indicator may include a bitmap or a value associated with the first portion. The subchannel group size may include or correspond to the subchannel group size as described at least with reference to FIG. 8.

In some implementations, to allocate the first portion the UE may identifying multiple values associated with allocation of a bandwidth including multiple subchannels available for a PSSCH resource. Each value may correspond to a subchannel location and a length, and the multiple values may include fewer values than a total number of subchannel and length combinations associated with contiguous and non-contiguous resource allocation of the multiple subchannels. Additionally, at least one value of the multiple values may corresponds to a non-contiguous resource allocation of two subchannels. In some other implementations, the UE may determine a value of the multiple values to allocate a first portion of the bandwidth for a PSSCH, and the value indicated by the indicator.

Thus, FIGS. 11-14 describe techniques and potential advantages for PSSCH resource allocation. For example, the UE may allocate the PSSCH resource to a number of sub-channels within a resource pool, which may be a large resource pool in IIoT cases implantations. The UE may indicate the allocated PSSCH resource using the indicator, such as one or more bits. The number of bits of the indicator, such as a number FDRA bits, may be reduced as compared to convention techniques, such as C-V2X messaging techniques. By having a relatively low number of bits, a relatability of the PSCCH and the coding gain is maintained. Additionally, an amount of overhead message is reduced as compared to convention techniques, such as C-V2X messaging techniques. As another example, the UE may allocate the PSSCH resources such that a set of allocated subchannels is non-contiguous in the frequency domain. By utilizing a set of subchannels that are non-contiguous in the frequency domain, the allocation of PSSCH resources may have frequency selectivity, frequency diversity, and flexibility, such as in an IIoT implementations in which an RF environment is complex and has interference from a variety of sources (e.g., neighboring machinery).

Figure 15:
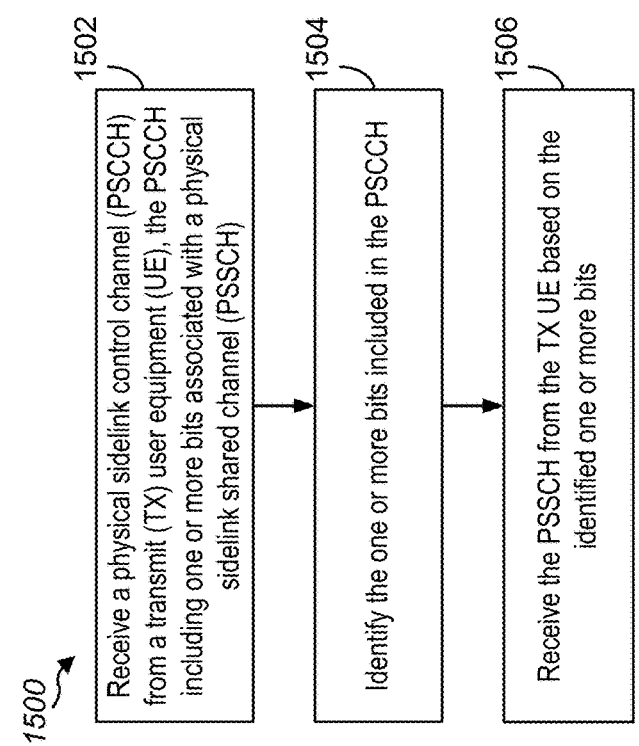
FIG. 15 is a flow diagram illustrating an example process that supports PSSCH resource allocation according to some aspects.

FIG. 15 is a flow diagram illustrating an example process 1500 that supports PSSCH resource allocation according to some aspects. Operations of the process 1500 may be performed by a UE, such as the UE 115 described above with reference to FIG. 1 or 2, the UE 115$f$ or 115$m$ of FIG. 4, the UE 115$j$ of FIG. 5, or the UE 360 of FIG. 6. For example, example operations (also referred to as "blocks") of the process 1500 may enable the UE to perform sidelink resources scheduling for unicast messaging.

In block 1502, the UE receives a PSCCH from a TX UE, the PSCCH includes one or more bits associated with a PSSCH. The PSCCH may include or correspond to the PSCCH 384 transmitted by UE 115. The one or more bits may include or correspond to the indicator 383. In some implementations, the one or more bits may have been generate or encoded by the TX UE using one or more techniques described with reference to FIGS. 6, 7, 8, 9A, 9B, or 10 or one of the processes described with reference to FIGS. 11-14. Additionally, or alternatively, the UE may receive the PSCCH by blind decoding. In block 1504, the UE identifies the one or more bits included in the received PSCCH.

In block 1506, the UE receives the PSSCH from the TX UE based on the identified one or more bits. The PSSCH may include or correspond to the PSSCH.

In some implementations, the UE may decode the one or more bits to identify a first portion of a bandwidth associated with multiple subchannels. For example, the UE may include mapping information 310 and may perform one or more operations to determine one or more subchannels, one or more slots, or a combination thereof, based on the one or more bits. The one or more operations may include one or more mapping operations, such as mapping operations based on a layer structure or a mapping table, translating a bit map to one or more subchannel groups, the like, or a combination thereof.

Thus, FIG. 15 describes techniques and potential advantages for PSSCH resource allocation. For example, the UE may identify an allocation, by a TX UE, of the PSSCH resource to a number of sub-channels within a resource pool, which may include a large resource pool in IIoT cases implantations. The UE identify the allocated PSSCH resource based on the indicator, such as the one or more bits. The number of bits of the indicator, such as a number FDRA bits, may be reduced as compared to convention techniques, such as C-V2X messaging techniques. By having a relatively low number of bits, a relatability of the PSCCH and the coding gain is maintained. Additionally, an amount of overhead message is reduced as compared to convention techniques, such as C-V2X messaging techniques. As another example, the UE identify the allocated PSSCH resource which may include a set of allocated subchannels that is non-contiguous in the frequency domain. By utilizing a set of subchannels that are non-contiguous in the frequency domain, the allocation of PSSCH resources may have frequency selectivity, frequency diversity, and flexibility, such as in an IIoT implementations in which an RF environment is complex and has interference from a variety of sources (e.g., neighboring machinery).

Figure 16:
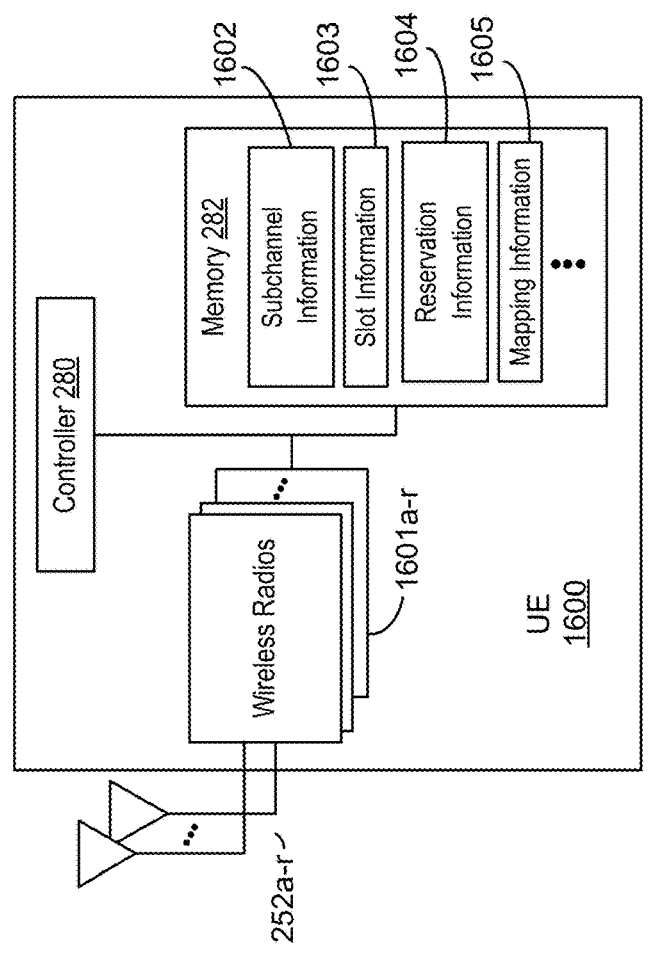
FIG. 16 is a block diagram of an example UE that supports PSSCH resource allocation according to some aspects.

FIG. 16 is a block diagram of an example UE 1600 that supports PSSCH resource allocation according to some aspects. The UE 1600 may be configured to perform operations, including the blocks of the processes 1100, 1100, 1200, 1300, 1400, or 1500 described with reference to FIGS. 11-15, to perform PSSCH resource allocation. In some implementations, the UE 1500 includes the structure, hardware, and components shown and described with reference to the UE 115 of FIG. 1, 2, or 6, the UE 115$f$, 115$m$, or 115$n$ of FIG. 4A, the UE 115$j$ or 115$k$ of FIGS. 5A and 5B, or the UE 360 of FIG. 6. For example, the UE 1600 includes the controller 280, which operates to execute logic or computer instructions stored in the memory 282, as well as controlling the components of the UE 1600 that provide the features and functionality of the UE 1600. The UE 1600, under control of the controller 280, transmits and receives signals via wireless radios 1601$a$-$r$ and the antennas 252$a$-$r$. The wireless radios 1601$a$-$r$ include various components and hardware, as illustrated in FIG. 2 for the UE 115, including the modulator and demodulators 254$a$-$r$, the MIMO detector 256, the receive processor 258, the transmit processor 264, and the TX MIMO processor 266. In some implementations, the wireless radios 1601$a$-$r$ may include or correspond to one or more interfaces, such as a Uu-interface, a PC5 interface, or a combination thereof.

As shown, the memory 282 may include subchannel information 1602, slot information 1603, reservation information 1604, and mapping information 1605. The subchannel information 1602, the slot information 1603, the reservation information 1604, and the mapping information 1605 may include or correspond to the subchannel information 306, the slot information 308, the reservation information 309, and the mapping information 310. The UE 1600 may receive signals from or transmit signals to one or more network entities, such as the base station 105 of FIG. 1, 2, or 6, the base station 105f of FIG. 4A, the base station 105e of FIG. 5A, the UE 115 of FIG. 1, 2, or 6, the UE 115f, 115m, or 115n of FIG. 4, the UE 115k, or 115j of FIGS. 5A and 5B, or the UE 360 of FIG. 6.

It is noted that one or more blocks (or operations) described with reference to FIGS. 11-14 may be combined with one or more blocks (or operations) described with reference to another of the figures. For example, one or more blocks (or operations) of FIG. 11 may be combined with one or more blocks (or operations) of FIG. 12. As another example, one or more blocks associated with any one of FIG. 11-14 may be combined with one or more blocks (or operations) associated with FIGS. 2, 4A-4C, 5A, 5B, or 6. As another example, one or more blocks associated with FIG. 15 may be combined with one or more blocks (or operations) associated with FIG. 2, 4, 5, or 6. Additionally, or alternatively, one or more operations described above with reference to FIGS. 1-15 may be combined with one or more operations described with reference to another of FIGS. 1-15.

In some aspects, techniques for supporting PSSCH resource allocation may include additional aspects, such as any single aspect or any combination of aspects described below or in connection with one or more other processes or devices described elsewhere herein. In a first aspect, techniques for supporting PSSCH resource allocation may include selects a layer of multiple layers of a layer structure. Each layer including one or more nodes and associated with a bandwidth including multiple subchannels available for a PSSCH resource. The techniques further include allocating, based on the selected layer, a first portion of the bandwidth for a PSSCH, and transmitting, to an RX UE, a PSCCH that includes an indicator associated with the allocated first portion. In some examples, the techniques in the first aspect may be implemented in a method or process. In some other examples, the techniques of the first aspect may be implemented in a wireless communication device, such as a UE (or a component of a UE). In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a second aspect, in combination with the first aspect, the layer structure is associated with a tree structure.

In a third aspect, in combination with the first aspect or the second aspect, the layer structure is a binary tree structure.

In a fourth aspect, in combination with one or more of the first aspect through the third aspect, the indicator indicates the selected layer.

In a fifth aspect, in combination with one or more of the first aspect through the fourth aspect, each layer of the multiple layers has a different node size of one or more nodes of the layer.

In a sixth aspect, in combination with one or more of the first aspect through the fifth aspect, a node size of the layer is determined based on a layer index value of the layer, a node index value, or a combination thereof In a seventh aspect, in combination with one or more of the first aspect through the sixth aspect, the indicator includes a set of one or more bits, and the PSCCH includes the indicator in an FDRA field, or a combination thereof In an eighth aspect, in combination with one or more of the first aspect through the seventh aspect, the PSCCH is transmitted in a node of the selected layer in a subchannel of the node having a lowest subchannel index value.

In a ninth aspect, in combination with one or more of the first aspect through the eighth aspect, the indicator includes an FDRA, a TDRA, or a combination thereof.

In a tenth aspect, in combination with one or more of the first aspect through the ninth aspect, the first portion corresponds to a first PSSCH reservation.

In an eleventh aspect, in combination with one or more of the first aspect through the tenth aspect, the techniques further include allocating, based on the selected layer, a second portion of the bandwidth for another PSSCH.

In a twelfth aspect, in combination with the eleventh aspect, the first portion and the second portion have the same allocation size.

In a thirteenth aspect, in combination with the twelfth aspect, the indicator is associated with the first portion and the second portion.

In a fourteenth aspect, in combination with one or more of the first aspect through the thirteenth aspect, the techniques further include selecting another layer of the multiple layers, the other layer different from the layer associated with the first portion.

In a fifteenth aspect, in combination with the fourteenth aspect, the techniques further include allocating, based on the other selected layer, a second portion of the bandwidth for another PSSCH.

In a sixteenth aspect, in combination with one or more of the twelfth aspect or the sixteenth aspect, the second portion corresponds to a second PSSCH reservation.

In a seventeenth aspect, in combination with one or more of the first aspect through the sixteenth aspect, at least one layer of the multiple layers corresponds to fewer than all subchannels of the multiple subchannels.

In some aspects, techniques for supporting PSSCH resource allocation may include additional aspects, such as any single aspect or any combination of aspects described below or in connection with one or more other processes or devices described elsewhere herein. In an eighteenth aspect, techniques for supporting PSSCH resource allocation include determining a subchannel group size associated with a bandwidth including multiple subchannels available for a PSSCH resource. The techniques also include allocating, based on the determined subchannel group size, a first portion of the bandwidth for a PSSCH, and transmit, to an RX UE, a PSCCH that includes an indicator associated with the allocated first portion. In some examples, the techniques in the eighteenth aspect may be implemented in a method or process. In some other examples, the techniques of the eighteenth aspect may be implemented in a wireless communication device, such as a UE (or a component of a UE). In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a nineteenth aspect, in combination with the eighteenth aspect, the group size is associated with two subchannels or three subchannels.

In a twentieth aspect, in combination with the eighteenth aspect or the nineteenth aspect, the indicator includes a bitmap associated with the first portion.

In a twenty-first aspect, in combination with one or more of the eighteenth through the twentieth aspect, the multiple subchannels are divided into multiple subchannel groups based on the subchannel group size, and the bitmap includes a bit for each subchannel group of the multiple subchannel groups.

In a twenty-second aspect, in combination with one or more of the eighteenth aspect through the twenty-first aspect, a portion of the bitmap associated with the first portion includes a number of bits that is less than a number of subchannel groups of the multiple sub channel groups.

In a twenty-third aspect, in combination with one or more of the eighteenth aspect through the twenty-second aspect, the first portion corresponds to a first PSSCH reservation.

In a twenty-fourth aspect, in combination with one or more of the eighteenth aspect through the twenty-third aspect, the techniques further include allocating, based on the determined subchannel group size, a second portion of the bandwidth for another PSSCH.

In a twenty-fifth aspect, in combination with the twenty-fourth aspect, the first portion and the second portion have the same allocation size.

In a twenty-sixth aspect, in combination with the twenty-fifth aspect, the indicator is associated with the first portion and the second portion.

In a twenty-seventh aspect, in combination with the twenty-sixth aspect, the indicator includes the bitmap associated with the first portion and a second bitmap or an offset associated with the second portion.

In a twenty-eighth aspect, in combination with one or more of the eighteenth aspect or the through twenty-seventh aspect, the second portion corresponds to a second PSSCH reservation.

In a twenty-ninth aspect, in combination with one or more of the eighteenth aspect or the nineteenth aspect, the indicator includes a value associated with the first portion, the value corresponds to a subchannel location and a subchannel group size for an allocated resource.

In a thirtieth aspect, in combination with the twenty-ninth aspect, the value is selected from multiple values, each value corresponding to a subchannel location and a subchannel group size.

In a thirty-first aspect, in combination with one or more of the twenty-ninth aspect through the thirtieth aspect, the multiple values are included in a mapping table of subchannel locations and subchannel group sizes.

In a thirty-second aspect, in combination with one or more of the twenty-ninth aspect through the thirty-first aspect, the mapping table supports non-contiguous resource allocation.

In a thirty-third aspect, in combination with one or more of the eighteenth aspect through the thirty-second aspect, the indicator includes a first portion having a value that indicates whether a second portion of the indicator is associated with a bitmap or a mapping value.

In some aspects, techniques for supporting PSSCH resource allocation may include additional aspects, such as any single aspect or any combination of aspects described below or in connection with one or more other processes or devices described elsewhere herein. In a thirty-fourth aspect, techniques for supporting PSSCH resource allocation include identifying multiple values associated with allocation of a bandwidth including multiple subchannels available for a PSSCH resource. Each value corresponding to a subchannel location and a length, and the multiple values include fewer values than a total number of subchannel and length combinations based on the multiple subchannels. The techniques also include determining a value of the multiple values to allocate a first portion of the bandwidth for a PSSCH, and transmitting, to an RX UE, a PSCCH that includes an indicator associated with the allocated first portion. In some examples, the techniques in the thirty-fourth aspect may be implemented in a method or process. In some other examples, the techniques of the thirty-fourth aspect may be implemented in a wireless communication device, such as a UE (or a component of a UE). In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a thirty-fifth aspect, in combination with the thirty-fourth aspect, the total number of subchannel and length combinations are associated with non-contiguous resource allocation of the multiple sub channels.

In a thirty-sixth aspect, in combination with the thirty-fourth aspect or the thirty-fifth aspect, the total number of subchannel and length combinations are associated with contiguous and non-contiguous resource allocation of the multiple subchannels, and at least one value of the multiple values corresponds to a non-contiguous resource allocation of two subchannels.

In a thirty-seventh aspect, in combination with one or more of the thirty-fourth aspect through the thirty-sixth aspect, the techniques further include receiving an RRC message from a base station.

In a thirty-eighth aspect, in combination with the thirty-sixth aspect, the RRC message is associated with the multiple values.

In a thirty-ninth aspect, in combination with the thirty-eighth aspect, the RRC message indicates the multiple values.

In a fortieth aspect, in combination with the thirty-eighth aspect, the RRC message indicates one or more values to be disabled of a total amount of values corresponding to the total number of subchannel and length combinations.

In a forty-first aspect, in combination with one or more of the thirty-fourth aspect through the fortieth aspect, the techniques further include disabling one or more values of a total amount of values corresponding to the total number of subchannel and length combinations to generate the multiple values.

In a forty-second aspect, in combination with the forty-first aspect, the one or more values that are disabled are selected randomly, based on a pattern, based on a subchannel, based on a length, or a combination thereof.

In a forty-third aspect, in combination with one or more of the thirty-fourth aspect through forty-second aspect, the first portion corresponds to a first PSSCH reservation.

In a forty-fourth aspect, in combination with one or more of the thirty-fourth aspect through the forty-third aspect, the techniques further include determining another value of the multiple values to allocate a second portion of the bandwidth for another PSSCH.

In a forty-fifth aspect, in combination with the forty-fourth aspect, the indicator is associated with the first portion and the second portion.

In a forty-sixth aspect, in combination with the forty-fifth aspect, the second portion corresponds to a second PSSCH reservation.

In some aspects, techniques for supporting PSSCH resource allocation may include additional aspects, such as any single aspect or any combination of aspects described below or in connection with one or more other processes or devices described elsewhere herein. In a forty-seventh aspect, techniques for supporting PSSCH resource allocation include allocating a first portion of a bandwidth including multiple subchannels available for a PSSCH resource. The first portion includes two non-contiguous subchannels. The techniques also include transmitting, to an RX UE, a PSCCH that includes an indicator associated with the first portion for a PSSCH. In some examples, the techniques in the forty-seventh aspect may be implemented in a method or process. In some other examples, the techniques of the forty-seventh aspect may be implemented in a wireless communication device, such as a UE (or a component of a UE). In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a forty-eighth aspect, in combination with the forty-seventh aspect, the first portion includes a first subchannel and a second subchannel.

In a forty-ninth aspect, in combination with the forty-seventh aspect or the forty-eighth, the first subchannel separated from the separate subchannel by one or more subchannels of the multiple subchannels and the indicator includes a set of one or more bits.

In a fiftieth aspect, in combination with one or more of the forty-seventh aspect through the forty-ninth aspect, the indicator is associate with SCI.

In a fifty-first aspect, in combination with one or more of the forty-seventh aspect through the fiftieth aspect, the indicator includes an FDRA, a TDRA, or a combination thereof.

In a fifty-second aspect, in combination with one or more of the forty-seventh aspect through the fifty-first aspect, the techniques further include transmitting the PSSCH in the first portion during a first slot.

In a fifty-third aspect, in combination with the fifty-second aspect, the PSCCH is transmitted during the first slot.

In a fifty-fourth aspect, alone or in combination with one or more of the forty-seventh aspect through the fifty-third aspect, to allocate the first portion, the techniques further include determining a subchannel group size associated with a bandwidth including multiple subchannels available for a PSSCH resource.

In a fifty-fifth aspect, in combination with the fifty-fourth aspect, the first portion is allocated based on the determined subchannel group size.

In a fifty-sixth aspect, in combination with the fifty-fifth aspect, the indicator includes a bitmap or a value associated with the first portion.

In a fifty-seventh aspect, alone or in combination with one or more of the forty-seventh aspect through the fifty-sixth aspect, to allocate the first portion, the techniques further include identifying multiple values associated with allocation of a bandwidth including multiple subchannels available for a PSSCH resource.

In a fifty-eighth aspect, in combination with the fifty-seventh aspect, each value corresponds to a subchannel location and a length.

In a fifth-ninth aspect, in combination with the fifty-eighth aspect, the multiple values include fewer values than a total number of subchannel and length combinations associated with contiguous and non-contiguous resource allocation of the multiple sub channels.

In a sixtieth aspect, in combination with the fifth-ninth aspect, at least one value of the multiple values corresponds to a non-contiguous resource allocation of two subchannels.

In a sixty-first aspect, in combination with the sixtieth aspect, to allocate the first portion, the techniques further include determining a value of the multiple values to allocate a first portion of the bandwidth for a PSSCH.

In a sixty-second aspect, in combination with the sixty-first aspect, the value is indicated by the indicator.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-16 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   determining a subchannel group size of a group of subchannels, the group of subchannels associated with a bandwidth including multiple subchannels available for a physical sidelink shared channel (PSSCH) resource, wherein the multiple subchannels are divided into multiple subchannel groups, each including one or more subchannels, in accordance with the subchannel group size;
   allocating, in accordance with the determined subchannel group size, a first portion of the bandwidth for a PSSCH; and
   transmitting, to a receive (RX) UE, a physical sidelink control channel (PSCCH) that includes an indicator associated with the allocated first portion.

2. The method of claim 1, wherein the indicator includes a bitmap associated with the first portion.

3. The method of claim 2, wherein the bitmap includes a bit for each subchannel group of the multiple subchannel groups.

4. The method of claim 3, wherein a portion of the bitmap associated with the first portion includes a number of bits that is less than a number of subchannel groups of the multiple subchannel groups, and wherein the first portion corresponds to a first PSSCH reservation.

5. The method of claim 1, further comprising:
   allocating, in accordance with the determined subchannel group size, a second portion of the bandwidth for another PSSCH, wherein:
      the first portion and the second portion have the same allocation size, and
      the indicator is associated with the first portion and the second portion.

6. The method of claim 5, wherein:
the indicator includes a bitmap associated with the first portion and a second bitmap or an offset associated with the second portion; or
the second portion corresponds to a second PSSCH reservation.

7. The method of claim 1, wherein:
the indicator includes a value associated with the first portion, the value corresponds to a subchannel location and a subchannel group size for an allocated resource; and
the value is selected from multiple values, each value corresponding to a subchannel location and a subchannel group size; or
the multiple values are included in a mapping table of subchannel locations and subchannel group sizes.

8. The method of claim 1, wherein allocating the first portion of the bandwidth for the PSSCH includes allocating one or more of the subchannels of the group of subchannels such that the one or more of the subchannels are non-contiguous in frequency.

9. The method of claim 7, wherein:
the multiple values are included in a mapping table of subchannel locations and subchannel group sizes; and
the mapping table supports non-contiguous resource allocation.

10. The method of claim 1, wherein the indicator includes a first portion having a value that indicates whether a second portion of the indicator is associated with a bitmap or a mapping value, and wherein the first portion is allocated in accordance with the determined subchannel group size.

11. A user equipment (UE) comprising:
at least one processor; and
a memory coupled with the at least one processor and storing processor-readable code that, when executed by the at least one processor, is configured to:
determine a subchannel group size of a group of subchannels, the group of subchannels associated with a bandwidth including multiple subchannels available for a physical sidelink shared channel (PSSCH) resource, wherein the multiple subchannels are divided into multiple subchannel groups, each including one or more subchannels, in accordance with the subchannel group size;
allocate, in accordance with the determined subchannel group size, a first portion of the bandwidth for a PSSCH; and
initiate transmission, to a receive (RX) UE, of a physical sidelink control channel (PSCCH) that includes an indicator associated with the allocated first portion.

12. The UE of claim 11, wherein the indicator includes a bitmap associated with the first portion.

13. The UE of claim 12, wherein the multiple subchannels are divided into multiple subchannel groups, each including one or more subchannels, in accordance with the subchannel group size, and wherein the bitmap includes a bit for each subchannel group of the multiple subchannel groups.

14. The UE of claim 13, wherein a portion of the bitmap associated with the first portion includes a number of bits that is less than a number of subchannel groups of the multiple subchannel groups, and wherein the first portion corresponds to a first PSSCH reservation.

15. The UE of claim 11, wherein the processor-readable code that, when executed by the at least one processor, is further configured to:

allocate, in accordance with the determined subchannel group size, a second portion of the bandwidth for another PSSCH, wherein:
the first portion and the second portion have the same allocation size, and
the indicator is associated with the first portion and the second portion.

16. The UE of claim 15, wherein:
the indicator includes a bitmap associated with the first portion and a second bitmap or an offset associated with the second portion; or
the second portion corresponds to a second PSSCH reservation.

17. The UE of claim 11, wherein the indicator includes a value associated with the first portion, the value corresponds to a subchannel location and a subchannel group size for an allocated resource.

18. The UE of claim 17, wherein:
the value is selected from multiple values, each value corresponding to a subchannel location and a subchannel group size; or
the multiple values are included in a mapping table of subchannel locations and subchannel group sizes.

19. The UE of claim 17, wherein:
the multiple values are included in a mapping table of subchannel locations and subchannel group sizes; and
the mapping table supports non-contiguous resource allocation.

20. The UE of claim 11, wherein the indicator includes a first portion having a value that indicates whether a second portion of the indicator is associated with a bitmap or a mapping value, and wherein the first portion is allocated in accordance with the determined subchannel group size.

21. A user equipment (UE) comprising:
means for determining a subchannel group size of a group of subchannels, the group of subchannels associated with a bandwidth including multiple subchannels available for a physical sidelink shared channel (PSSCH) resource, wherein the multiple subchannels are divided into multiple subchannel groups, each including one or more subchannels, in accordance with the subchannel group size;
means for allocating, in accordance with the determined subchannel group size, a first portion of the bandwidth for a PSSCH; and
means for transmitting, to a receive (RX) UE, a physical sidelink control channel (PSCCH) that includes an indicator associated with the allocated first portion.

22. The UE of claim 21, wherein the indicator includes a bitmap associated with the first portion.

23. The UE of claim 22, wherein the bitmap includes a bit for each subchannel group of the multiple subchannel groups.

24. The UE of claim 23, wherein a portion of the bitmap associated with the first portion includes a number of bits that is less than a number of subchannel groups of the multiple subchannel groups, and wherein the first portion corresponds to a first PSSCH reservation.

25. The UE of claim 21, further comprising
means for allocating, in accordance with the determined subchannel group size, a second portion of the bandwidth for another PSSCH, wherein:
the first portion and the second portion have the same allocation size, and
the indicator is associated with the first portion and the second portion.

26. The UE of claim 25, wherein:
the indicator includes a bitmap associated with the first portion and a second bitmap or an offset associated with the second portion; or
the second portion corresponds to a second PSSCH reservation.

27. The UE of claim 21, wherein the indicator includes a value associated with the first portion, the value corresponds to a subchannel location and a subchannel group size for an allocated resource.

28. The UE of claim 27, wherein:
the value is selected from multiple values, each value corresponding to a subchannel location and a subchannel group size; or
the multiple values are included in a mapping table of subchannel locations and subchannel group sizes.

29. The UE of claim 27, wherein:
the multiple values are included in a mapping table of subchannel locations and subchannel group sizes; and
the mapping table supports non-contiguous resource allocation.

30. The UE of claim 21, wherein the indicator includes a first portion having a value that indicates whether a second portion of the indicator is associated with a bitmap or a mapping value, and wherein the first portion is allocated in accordance with the determined subchannel group size.

31. A non-transitory computer-readable medium storing instructions that, when executed by a processor, cause the processor to perform operations comprising:
determining a subchannel group size of a group of subchannels, the group of subchannels associated with a bandwidth including multiple subchannels available for a physical sidelink shared channel (PSSCH) resource, wherein the multiple subchannels are divided into multiple subchannel groups, each including one or more subchannels, in accordance with the subchannel group size;
allocating, in accordance with the determined subchannel group size, a first portion of the bandwidth for a PSSCH; and
transmitting, to a receive (RX) UE, a physical sidelink control channel (PSCCH) that includes an indicator associated with the allocated first portion.

32. The non-transitory computer-readable medium of claim 31, wherein the indicator includes a bitmap associated with the first portion.

33. The non-transitory computer-readable medium of claim 32, wherein the bitmap includes a bit for each subchannel group of the multiple subchannel groups.

34. The non-transitory computer-readable medium of claim 33, wherein a portion of the bitmap associated with the first portion includes a number of bits that is less than a number of subchannel groups of the multiple subchannel groups, and wherein the first portion corresponds to a first PSSCH reservation.

35. The non-transitory computer-readable medium of claim 31, further comprising
allocating, in accordance with the determined subchannel group size, a second portion of the bandwidth for another PSSCH, wherein:
the first portion and the second portion have the same allocation size; and
the indicator is associated with the first portion and the second portion.

36. The non-transitory computer-readable medium of claim 35, wherein:
the indicator includes a bitmap associated with the first portion and a second bitmap or an offset associated with the second portion; or
the second portion corresponds to a second PSSCH reservation.

37. The non-transitory computer-readable medium of claim 31, wherein the indicator includes a value associated with the first portion, the value corresponds to a subchannel location and a subchannel group size for an allocated resource.

38. The non-transitory computer-readable medium of claim 37, wherein:
the value is selected from multiple values, each value corresponding to a subchannel location and a subchannel group size; or
the multiple values are included in a mapping table of subchannel locations and subchannel group sizes.

39. The non-transitory computer-readable medium of claim 37, wherein:
the multiple values are included in a mapping table of subchannel locations and subchannel group sizes; and
the mapping table supports non-contiguous resource allocation.

40. The non-transitory computer-readable medium of claim 31, wherein the indicator includes a first portion having a value that indicates whether a second portion of the indicator is associated with a bitmap or a mapping value, and wherein the first portion is allocated in accordance with the determined subchannel group size.

41. An apparatus comprising:
a processor system coupled to an interface configured for wireless communication, the processor system configured to:
determine a subchannel group size of a group of subchannels, the group of subchannels associated with a bandwidth including multiple subchannels available for a physical sidelink shared channel (PSSCH) resource, wherein the multiple subchannels are divided into multiple subchannel groups, each including one or more subchannels, in accordance with the subchannel group size; and
allocate, in accordance with the determined subchannel group size, a first portion of the bandwidth for a PSSCH; and
the interface configured to transmit, to a receive (RX) user equipment (UE), a physical sidelink control channel (PSCCH) that includes an indicator associated with the allocated first portion.

42. The apparatus of claim 41, wherein the indicator includes a bitmap associated with the first portion.

43. The apparatus of claim 42, wherein the bitmap includes a bit for each subchannel group of the multiple subchannel groups.

44. The apparatus of claim 43, wherein a portion of the bitmap associated with the first portion includes a number of bits that is less than a number of subchannel groups of the multiple subchannel groups, and wherein the first portion corresponds to a first PSSCH reservation.

45. A method of wireless communication performed by a user equipment (UE), the method comprising:
generating a physical sidelink control channel (PSCCH) that includes an indicator, the indicator associated with an allocation, in accordance with a determined subchannel group size of a group of subchannels, the group of subchannels associated with a bandwidth including multiple subchannels available for a physical sidelink shared channel (PSSCH) resource, of first portion of the bandwidth for a PSSCH, wherein the multiple subchannels are divided into multiple subchannel groups, each including one or more subchannels, in accordance with the determined subchannel group size; and transmitting, to a receive (RX) UE, the PSCCH that includes the indicator.

46. The method of claim 45, further comprising:

determining a subchannel group size associated with a bandwidth including multiple sub channels available for a physical sidelink shared channel (PSSCH) resource; and allocating, in accordance with the determined subchannel group size, a first portion of the bandwidth for a PSSCH.

47. The method of claim 45, wherein the group size is associated with two subchannels or three subchannels, and wherein the indicator includes a bitmap associated with the first portion.

48. The method of claim 47, wherein the bitmap includes a bit for each subchannel group of the multiple subchannel groups.

* * * * *